(12) United States Patent
Ito

(10) Patent No.: US 6,310,853 B1
(45) Date of Patent: Oct. 30, 2001

(54) RECORDING MEDIUM LOADING APPARATUS AND RECORDING MEDIUM RECORDING AND/OR REPRODUCING APPARATUS

(75) Inventor: Shinji Ito, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/367,803

(22) PCT Filed: Jan. 12, 1999

(86) PCT No.: PCT/JP99/00064

§ 371 Date: Sep. 17, 1999

§ 102(e) Date: Sep. 17, 1999

(87) PCT Pub. No.: WO99/36909

PCT Pub. Date: Jul. 22, 1999

(30) Foreign Application Priority Data

Jan. 16, 1998 (JP) .................................................. 10-006956

(51) Int. Cl.[7] .................................................. G11B 17/22
(52) U.S. Cl. .............................................. 369/192; 369/178
(58) Field of Search ................................ 369/36, 38, 178, 369/191–194

(56) References Cited

U.S. PATENT DOCUMENTS 5,508,994   4/1996   Nakamichi et al. .
6,031,811 * 2/2000   Umesaki et al. ...................... 369/178
6,052,356 * 4/2000   Fujimoto et al. ..................... 369/192
6,058,096 * 5/2000   Fujita et al. .......................... 369/192

FOREIGN PATENT DOCUMENTS

| 1096126A | 12/1994 | (CN) . |
| 0 614181A2 | 9/1994 | (EP) . |
| 6-12769 | 1/1994 | (JP) . |
| 6-259870 | 9/1994 | (JP) . |
| 7-272383 | 10/1995 | (JP) . |

* cited by examiner

Primary Examiner—William Klimowicz
(74) Attorney, Agent, or Firm—Oblon, Spivak, McClelland, Maier & Neustadt, P.C.

(57) ABSTRACT

By reducing driving sources, the whole of the apparatus can be reduced in weight, made compact in size and a manufacturing cost can be reduced. The apparatus includes a plurality of disc trays on which optical discs can be held, an optical pickup device for recording or reproducing optical discs on the disc trays, a tray holder for housing a plurality of disc trays in such a manner that the disc trays are stacked, elevating means for elevating the tray holder in the direction approximately perpendicular to the direction in which a plurality of disc trays are stacked, translating means for translating the disc trays among a first position at which the optical disc can be held on the disc tray, a second position at which the disc trays are housed in the tray holder and a third position at which the optical disc on the disc tray can be recorded or reproduced by the optical pickup device and a single motor for supplying a driving force to the elevating means and the translating means.

44 Claims, 19 Drawing Sheets

RECORDING MEDIUM LOADING APPARATUS AND RECORDING MEDIUM RECORDING AND/OR REPRODUCING APPARATUS

TECHNICAL FIELD

The present invention relates to an information storage apparatus for recording and/or reproducing information by using an optical disc such as a CD (compact disc), a CD-ROM or the like and a disc-like recording medium such as a magnetooptical disc (MO) or the like. Particularly, this invention relates to a recording medium loading apparatus and a recording medium recording and/or reproducing apparatus in which an operation for conveying any holding member of a plurality of holding members on which disc-like recording media are held between a stock position and a chucking position and an operation for elevating a housing member for housing a plurality of holding members can be selectively carried out by a single driving source.

BACKGROUND ART

Heretofore, as an example of information storage apparatus, there have been provided disc recording and/or reproducing apparatus for reproducing a piece of music and movies or the like by using a disc-like recording medium such as a CD, a CD-ROM and so on. As a disc recording and/or reproducing apparatus of this kind, there is known a disc player 1 shown in FIG. 1, for example.

This disc player 1 houses three disc cartridges 2 at one time and has a function to continuously reproduce three discs housed in the disc cartridges 2 or to reproduce tunes recorded on the discs housed in the three disc cartridges 2 in the arbitrary sequential order. To this end, this disc player 1 includes a changer apparatus 3 capable of housing three disc cartridges 2, a conveying mechanism for selectively conveying an arbitrary disc cartridge 2 between the changer apparatus 3 and the disc drive apparatus and a reproducing apparatus for chucking the disc cartridge 2 conveyed by this conveying mechanism and reproducing a piece of music or the like from the disc or the like.

The changer apparatus 3 is attached to the central portion of the front surface of an apparatus body 4, and three cartridge insertion slots 5a, 5b, 5c are opened in the front surface thereof. These three cartridge insertion slots 5a, 5b, 5c are formed in the form of three layers at a predetermined interval in the upper and lower direction. on one sides of the respective cartridge insertion slots 5a to 5c,there are provided eject buttons 6a, 6b, 6c for individually ejecting the disc cartridges 2 inserted into the corresponding cartridge insertion slots 5a to 5c.

The front surface of this changer apparatus 3 can be opened and closed by an openable and closable lid 7 attached to the front surface of the apparatus body 4. On the both sides of operable and closable lid 7 there are located a number of operation buttons 8 such as a power button for turning on or off a power, a forward button, a stop button and so on. When this operable and closable lid 7 is opened to expose the front surface of the changer apparatus 3 and the disc cartridges 2 are individually inserted into the cartridge insertion slots 5a to 5c,the three disc cartridges 2 are housed into and held at predetermined positions, respectively.

On the rearward of the changer apparatus 3 there is provided a conveying mechanism for selectively picking up and conveying an arbitrary one of the three disc cartridges 2 housed at the predetermined positions. In the vicinity of this conveying mechanism, there is disposed a disc reproducing apparatus for chucking a disc which is a recording medium of the disc cartridge 2 supplied to and loaded onto the predetermined position from this conveying mechanism and reading a music signal or the like from the disc to reproduce a piece of music or the like.

However, the above-mentioned conventional disc player 1 needs totally three motors of a motor for elevating and lowering a take-out holder for selecting and taking out an arbitrary disc cartridge 2 from the three disc cartridges 2 housed in the three cartridge housing portions, a motor for conveying a cartridge holder for holding the disc cartridge 2 thus taken-out to the disc reproducing apparatus and a motor for chucking and rotating the disc cartridge 2 supplied to this disc reproducing apparatus at a predetermined speed as driving sources. Accordingly, since the independent motors are used each time the disc cartridge is taken out and the disc cartridge is conveyed or the like, the apparatus needs a number of motors being used so that the weight of the whole apparatus increases, which is also uneconomical.

In view of the aforesaid problem encountered with the prior art, it is an object of the present invention to solve the above-described problem by providing a recording medium loading apparatus and a recording medium recording and/or reproducing apparatus in which the whole of the apparatus can be made light in weight and small in size by reducing the driving sources and in which a manufacturing cost can be reduced.

DISCLOSURE OF THE INVENTION

A recording medium recording and/or reproducing apparatus according to this invention comprises a plurality of holding members capable of holding recording media, a recording and/or reproducing means for recording and/or reproducing recording media held on the holding members, a housing means for housing a plurality of holding members in a stacked state, an elevating means for elevating and lowering this housing means in the direction approximately perpendicular to the stacked direction of a plurality of holding members, a translate means for translating the holding member among a first position at which the recording medium can be held on the holding member, a second position at which the holding member can housed in the housing means and a third position at which the recording medium on the holding member can be recorded and/or reproduced by the recording and/or reproducing means and a single motor for supplying a driving force to the elevating means and the translating means.

Further, a recording medium recording and/or reproducing apparatus according to this invention comprises a plurality of holding members on which recording media can be held, recording and/or reproducing means for recording or reproducing recording media on the holding means, housing means for housing the plurality of holding members in such a manner that the holding members are stacked, elevating means for elevating the housing means in the direction approximately perpendicular to the direction in which the plurality of holding members are stacked, translating means for translating the holding members among a first position at which the holding members can hold recording media, a second position at which the holding members can be housed in the housing means and a third position at which the recording medium on the holding member can be recorded and/or reproduced by the recording and/or reproducing means, a single motor for supplying a driving force to the elevating means and the translating means, and driving means for selectively driving the translating means and the elevating means based on a driving force from the motor, wherein during the recording medium is being recorded or reproduced by the recording and/or reproducing means, the driving means operates the elevating means and drives the translating means to translate any one of the plurality of holding means housed in the housing means from the second position to the first position.

Also, a recording medium loading apparatus according to the present invention comprises a plurality of holding members on which recording media can be held, housing means for housing the plurality of holding members in such a manner that the holding members are stacked, elevating means for elevating the housing means in the direction approximately perpendicular to the direction in which the plurality of holding members are stacked, translating means for translating the holding members among a first position at which the holding members can hold recording media, a second position at which the holding members can be housed in the housing means and a third position which is located on the same straight line of the first and second positions which is opposite to the first position across the housing means and a single motor for supplying a driving force to the elevating means and the translating means.

Furthermore, a recording medium loading apparatus according to the present invention includes a plurality of holding members on which recording media can be held, housing means for housing the plurality of holding members in such a manner that the holding members are stacked, elevating means for elevating the housing means in the direction approximately perpendicular to the direction in which the plurality of holding members are stacked, translating means for translating the holding members among a first position at which the holding members can hold recording media, a second position at which the holding members can be housed in the housing means and a third position which is located on the same straight line of the first and second positions which is opposite to the first position across the housing means, a single motor for supplying a driving force to the elevating means and the translating means, and driving means for selectively driving the translating means and the elevating means based on a driving force from the motor, wherein under the condition that one of a plurality of holding members is located at the third position, the driving means drives the elevating means and the translating means to translate any one of a plurality of holding members housed in the housing means from the second position to the first position.

BEST MODE FOR CARRYING OUT THE INVENTION

An embodiment of the present invention will hereinafter be described with reference to the drawings. FIGS. 2 to 20 show the embodiment of the present invention, and the present invention is applied to a disc reproducing apparatus for reproducing a preformatted disc applied to a recording medium recording and/or reproducing apparatus for recording (writing) and/or reproducing (reading) information by using an optical disc and a magnetooptical disc such as a disc-like CD or the like as a recording medium.

Figure 1:
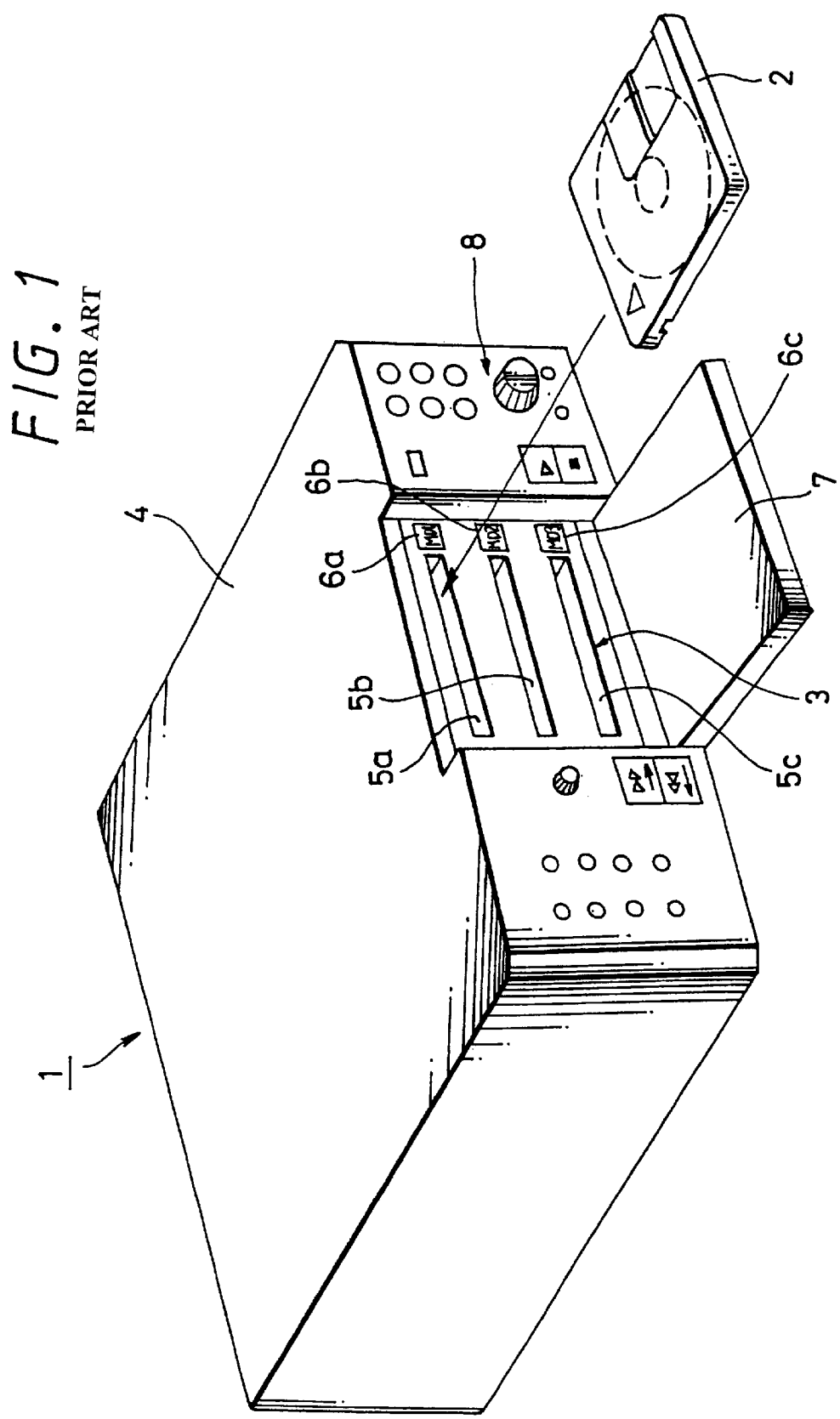
FIG. 1 is a perspective view showing an example of a recording medium recording and/or reproducing apparatus according to the prior art.
Figure 2:
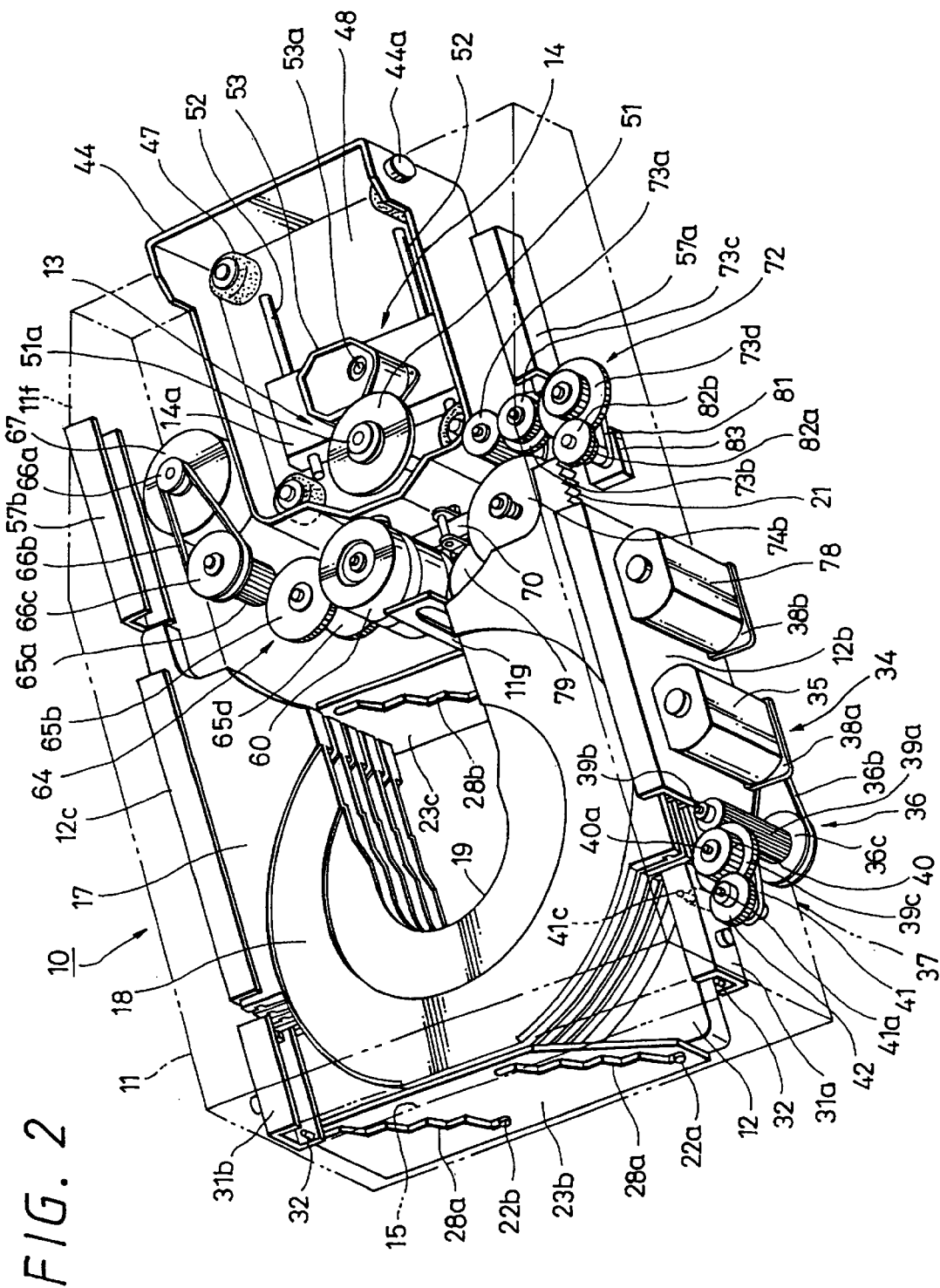
FIG. 2 is a perspective view showing an inside structure of a disc player apparatus illustrated as an embodiment of a recording medium recording and/or reproducing apparatus according to the present invention.
Figure 3:
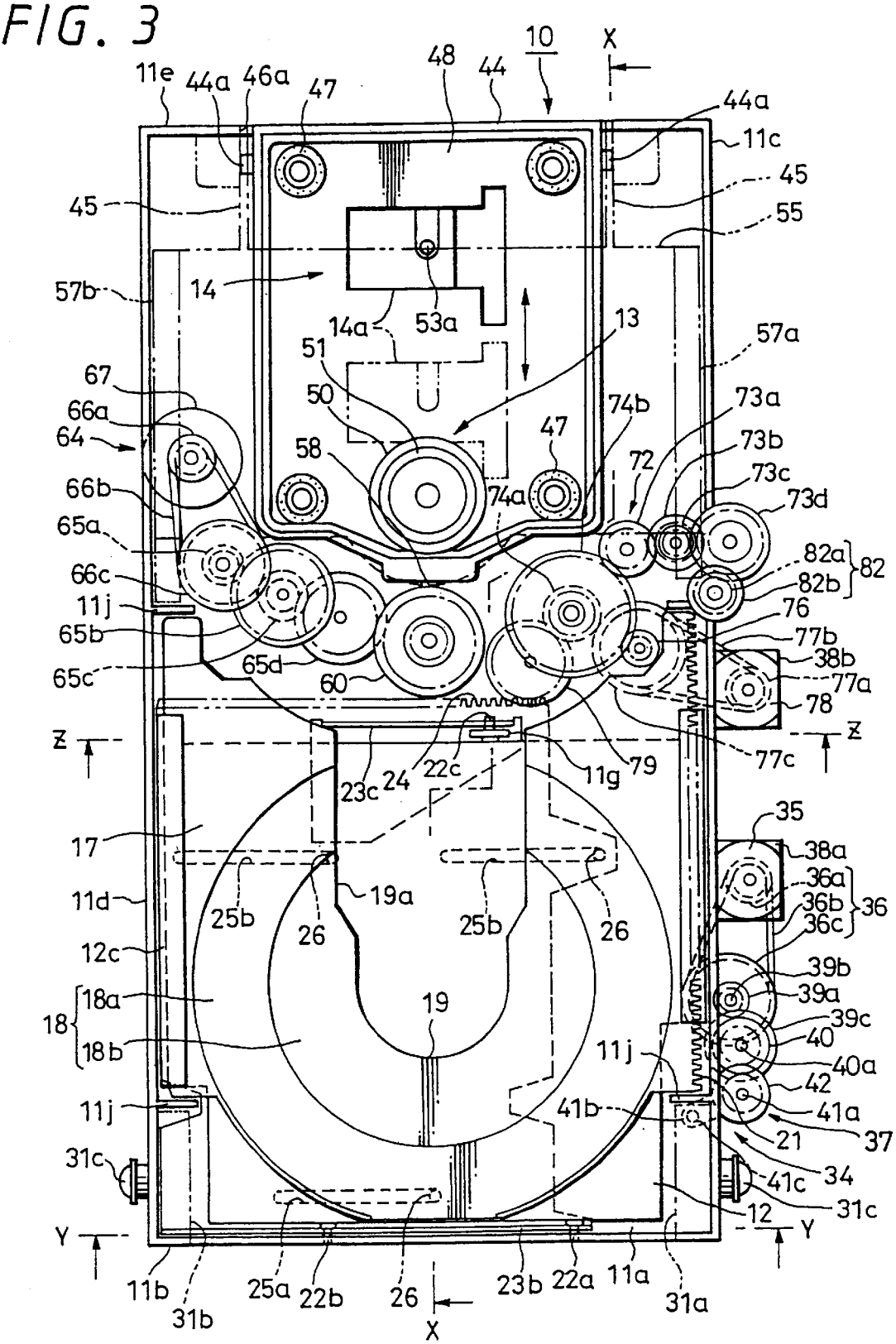
FIG. 3 is a plan view showing a tray housed state of the disc player apparatus shown in FIG. 2.

A disc reproducing apparatus 10 according to the embodiment of the present invention includes a mechanical chassis 11 formed of a housing whose upper surface is opened as shown in FIGS. 2 and 3. This mechanical chassis 11 includes a tray holder 12 for stocking five preformatted optical discs D which show a specific example of a disc-like recording medium, a disc rotation drive apparatus 13 for loading the supplied optical disc D and rotating the same at a predetermined speed, an optical pickup device 14 for reading an information signal from the optical disc D rotated at a predetermined speed, a controller for controlling operations of these apparatus and other apparatus.

Figure 4:
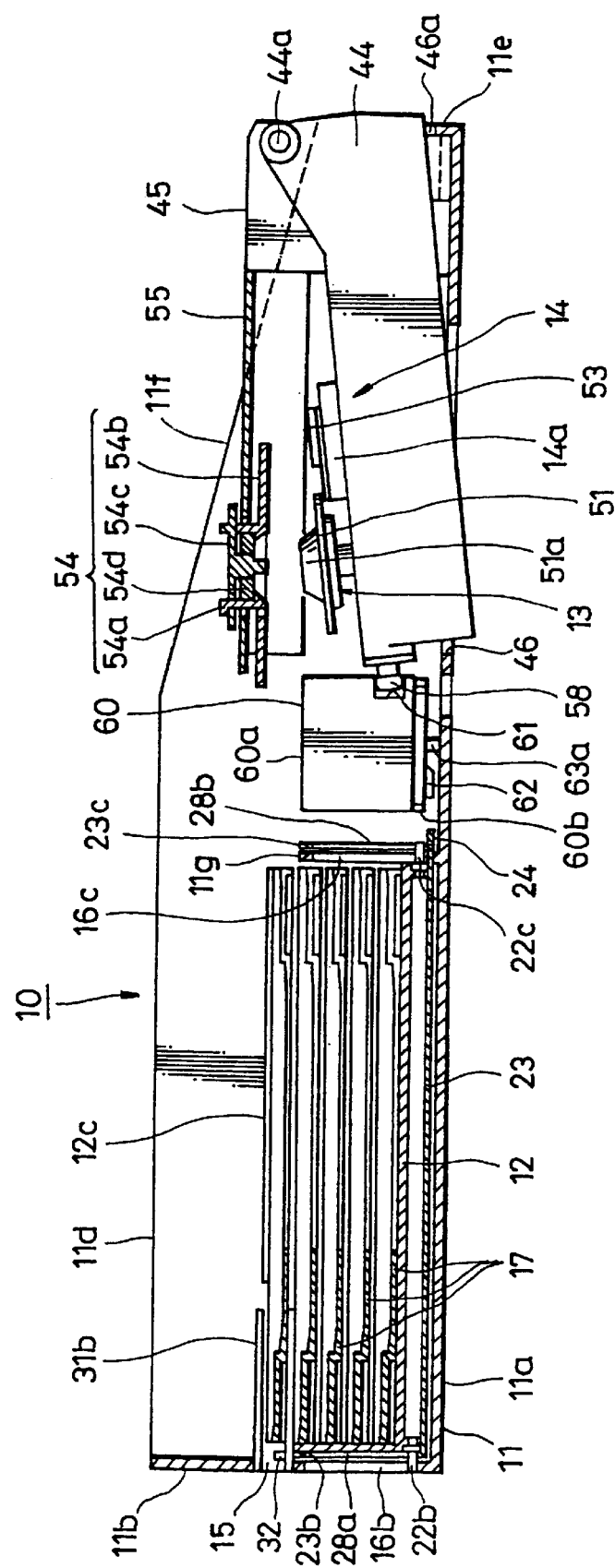
FIG. 4 is a cross-sectional view of the disc player apparatus shown in FIG. 2 and which is taken along the line X—X in FIG. 3.
Figure 5:
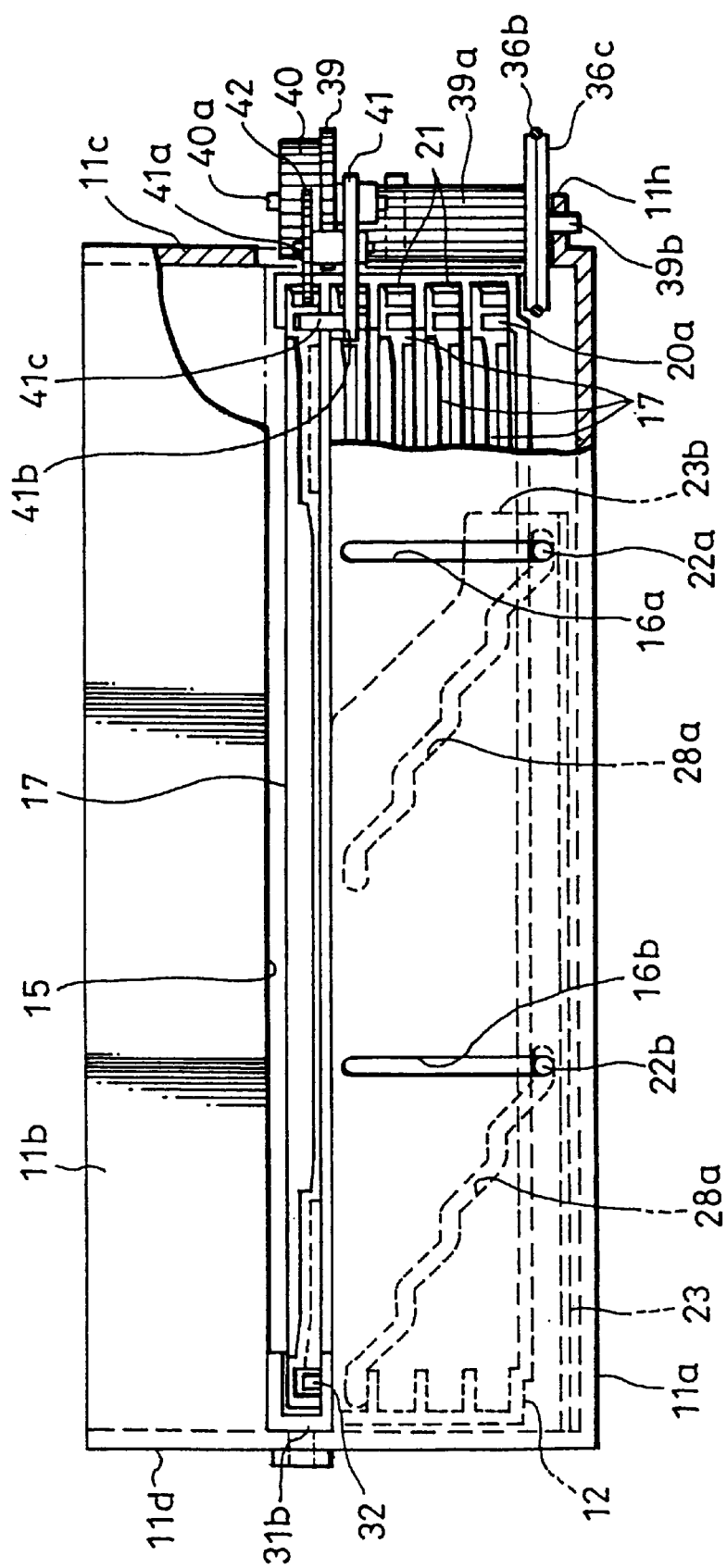
FIG. 5 is a partly-cutaway front view of the disc player apparatus shown in FIG. 2.

The mechanical chassis 11 includes a rectangular bottom surface plate portion 11a, a front surface plate portion 11b contiguous to the front portion of this bottom surface plate portion 11a, left and right side surface plate portions 11c, 11d contiguous to both side portions of the bottom surface plate portion 11a and a rear surface plate portion lie contiguous to the rear portion of the bottom surface plate portion 11a. An inclined portion 11f, which is inclined in the rearward, is formed from the two side surface plate portions 11c, 11d to the rear surface plate portion 11e. The front surface plate portion 11b of this mechanical chassis 11 has a tray entrance 15 which is formed of a rectangular opening portion extended at substantially the central portion in the lateral direction as shown in FIGS. 4 and 5. At the lower portion of the tray entrance 15, there are formed two vertical grooves 16a, 16b, which are extended in the upper and lower direction, at a predetermined interval in the lateral direction.

Figure 14:
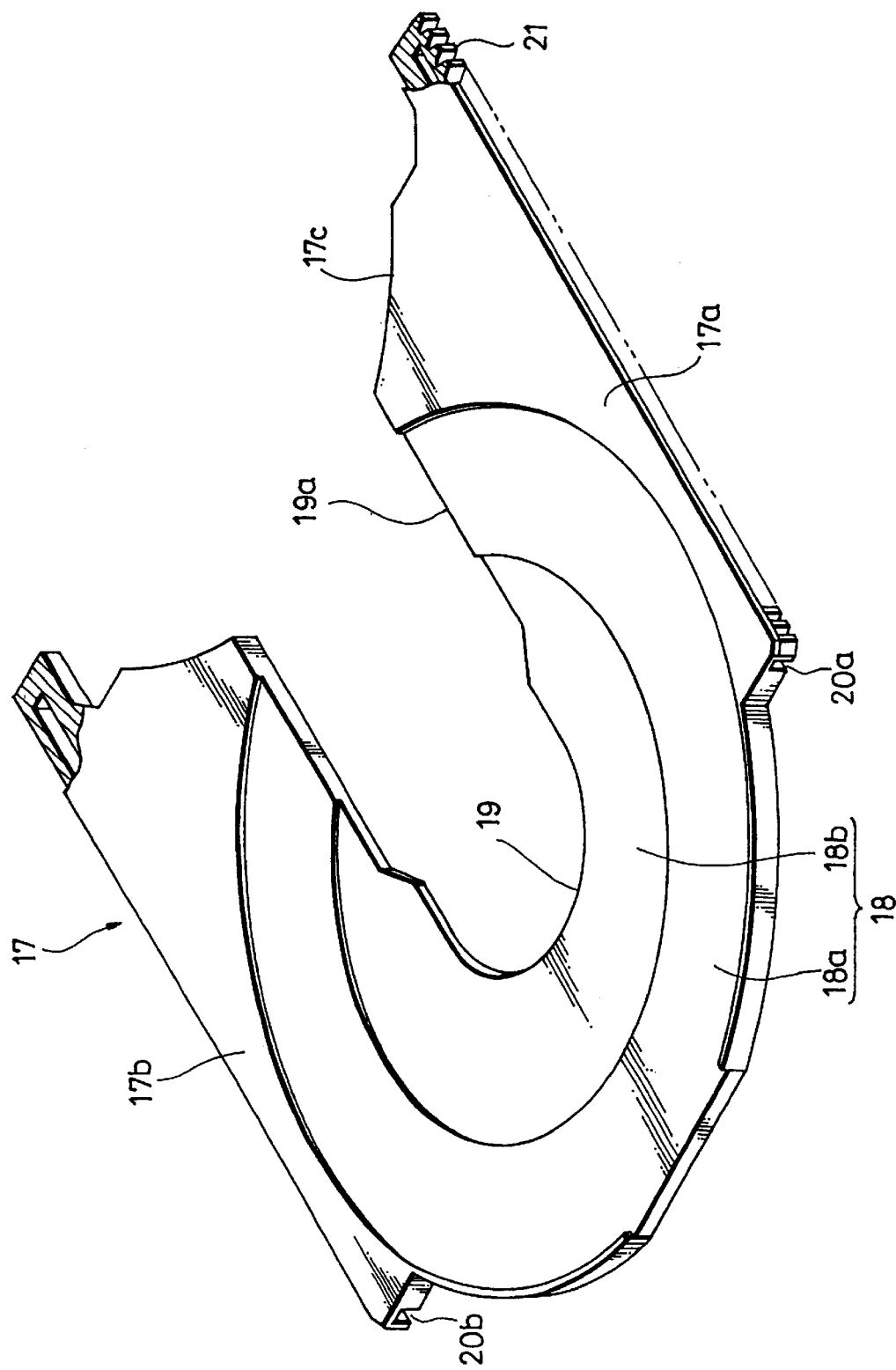
FIG. 14 is a perspective view showing a disc tray according to the disc player apparatus shown in FIG. 2.

A disc tray 17 on which the optical disc D is held is entered and ejected from the tray entrance 15 of this front surface plate portion 11b. As shown in FIG. 14, this disc tray 17 is formed of a plate-like member larger than the optical disc D being used and includes at its central portion a disc holding portion 18 which comprises a large-diameter recess portion 18a on which an optical disc D having a diameter of 12 cm, for example, is held and a small-diameter recess portion 18b on which an optical disc D having a diameter of 8 cm is held. A front portion of this disc holding portion 18 is protruded in a semi-circular fashion, and includes at both sides of the width direction left and right expanded portions 17a, 17b which are elongated in the rearward.

This disc tray 17 includes at the central portion of the disc holding portion 18 an opening hole 19 into which a turntable of the disc rotation driving apparatus 13, which will be described later on, is inserted from the lower direction. A wide opening portion 19a is contiguous to the rearward of this opening hole 19. This opening portion 19a is directly elongated in the backward and communicated with a recess portion 17c formed so as not to contact with a cam member, an elevating member or the like which will be described later on.

The left and right expanded portions 17a, 17b of the disc tray 17 include guide grooves 20a, 20b opened respectively in the lower surface side and which are straight elongated in the front and rear direction. These guide grooves 20a, 20b are used to restrict the movement of the disc tray 17 in the lateral direction to thereby enter and eject the disc tray 17 from the tray entrance 15 in a straight line fashion. Upon eject mode, guide protrusions 32 formed on the mechanical chassis 11 side are slidably inserted into the respective guide grooves 20a, 20b. Further, one expanded portion 17a has on its side edge a rack 21 extended from the tip end portion to the rear end portion thereof.

Figure 15:
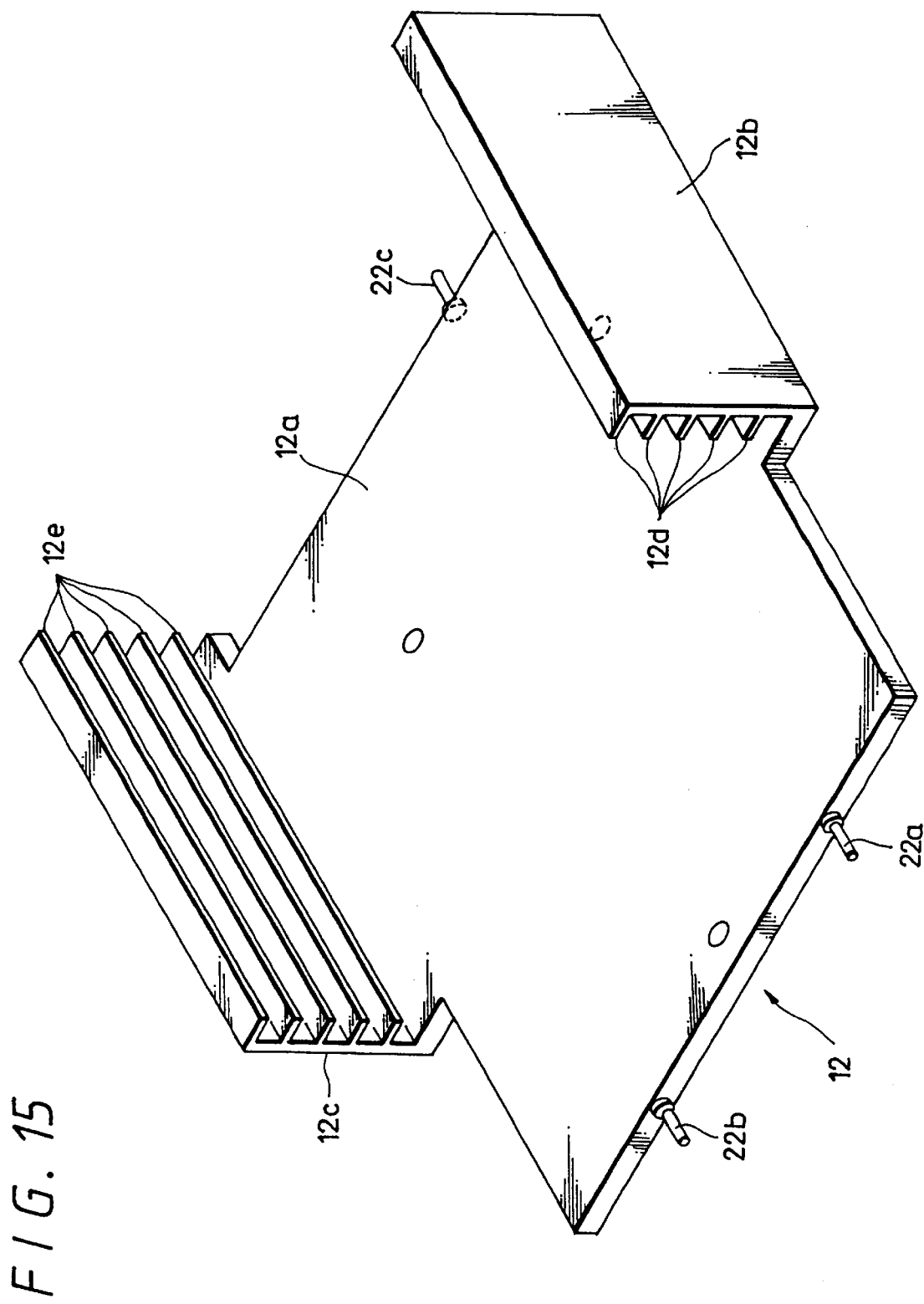
FIG. 15 is a perspective view showing a tray holder according to the disc player apparatus shown in FIG. 2.

The five disc trays 17 thus arranged are housed in the tray holder 12 in such a manner that information recording surfaces which are the major surfaces of the optical discs D held on the disc holding portion 18 are made substantially parallel to each other, i.e. in the stacked state. As shown in FIG. 15, this tray holder 12 includes a base plate portion 12a formed slightly larger than the disc tray 17 and left and right side surface plate portions 12b, 12c elevated from both sides in the width direction of the base plate portion 12a. In the insides of the respective side surface plate portions 12b, 12c, there are formed five shelf plate portions 12d, 12e at a predetermined interval in the upper and lower direction. The shelf plate portions 12d, 12e of the uppermost stage are used to prevent the disc tray 17, housed in the tray holder 12 of the uppermost stage, from being extracted in the upper direction. The left and right expanded portions 17a, 17b of the disc tray 17 are held on the respective shelf plate portions 12d, 12e of the stages following the second stage and the base plate portion 12a, thereby resulting in the tray housing portion being formed.

The tray holder 12 has at its front portion two guide pins 22a, 22b which are protruded in the front direction. The tray holder 12 has at it rear portion a single guide pin 22c which is protruded ion the rearward. The two guide pins 22a, 22b in the front portion are set with a proper interval in the lateral direction and form a triangle among them and the rear guide pin 22c to thereby support the tray holder at three points with a satisfactory stability.

Figure 16:
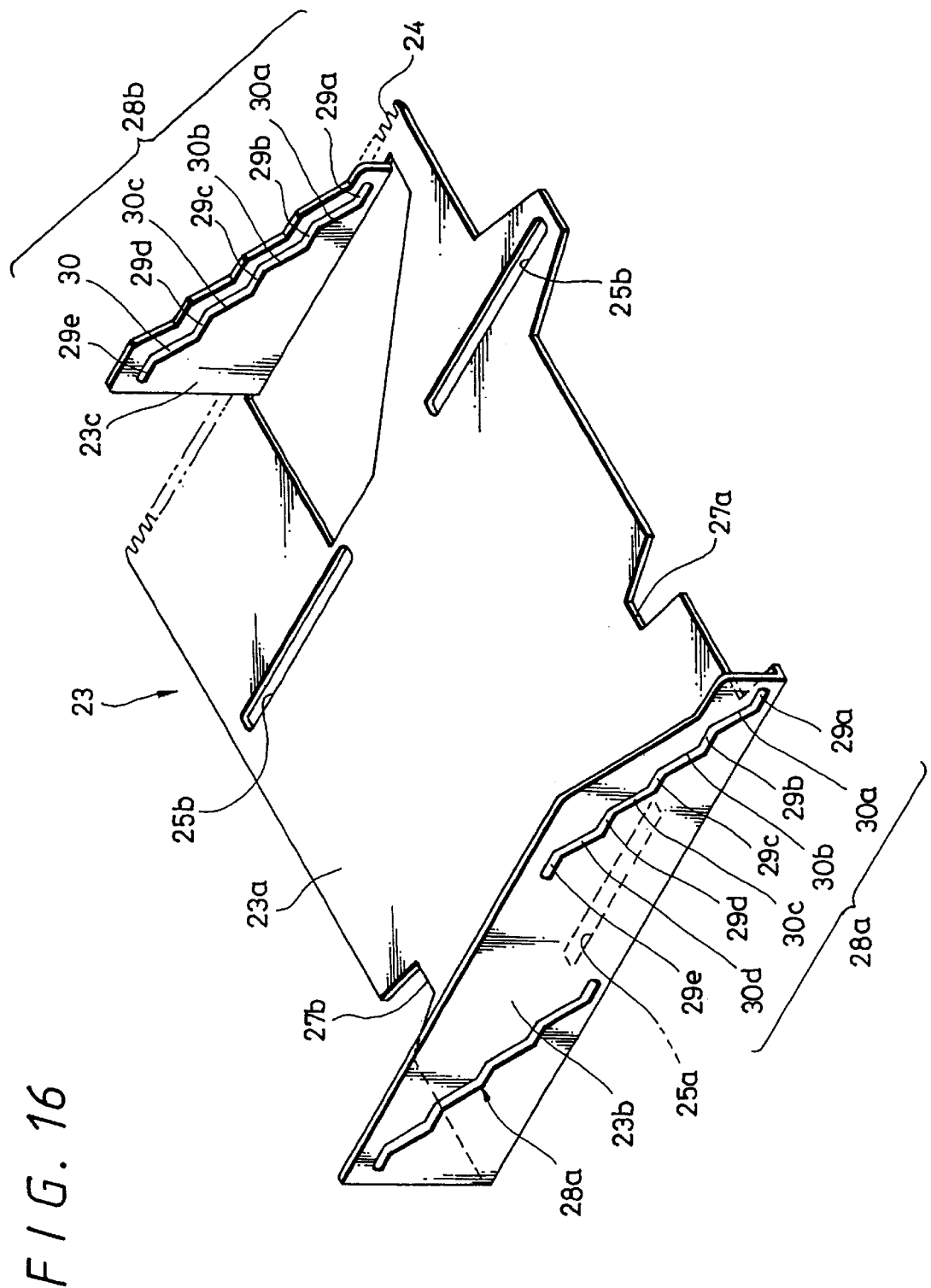
FIG. 16 is a perspective view showing a slide plate according to the disc player apparatus shown in FIG. 2.

The tray holder 12 having such configuration is held on a slide plate 23. As shown in FIG. 16, this slide plate 23 includes a lower surface plate portion 23a formed slightly larger than the tray holder 12 in the front and rear direction, a front elevation plate portion 23b which results from bending a portion contiguous to the front portion of the lower surface plate portion 23a in the upper direction and a rear elevation plate portion 23c which results from bending a part of the rear portion of the lower surface plate portion 23a in the upper direction. On the rear end portion of the lower surface plate portion 23a, there is formed a rack 24 whose gear teeth, which are meshed with a gear, which will be described later on, are elongated in the left and right direction perpendicular to the front and rear direction.

Further, the lower surface plate portion 23a of the slide plate 23 has rectangular holes 25a, 25b defined at three places to translate this slide plate 23 in the left and right direction. Of the three rectangular holes, one rectangular hole 25a is defined at approximately a central portion of the front portion of the lower surface plate portion 23a and other remaining two rectangular openings 25b, 25b are defined parallelly in the front side of the opening portion which results from bending the rear elevation plate portion 23c, thereby resulting in a rectangle being formed on the whole. Into these rectangular holes 25a, 25b,there are slidably inserted guide pins 26 formed on the bottom surface plate portion 11a of the mechanical chassis 11. The lower surface plate portion 23a has on both side portions thereof recesses 27a, 27b defined so as not to contact with reinforcing ribs 11j of the mechanical chassis 11.

Figure 6:
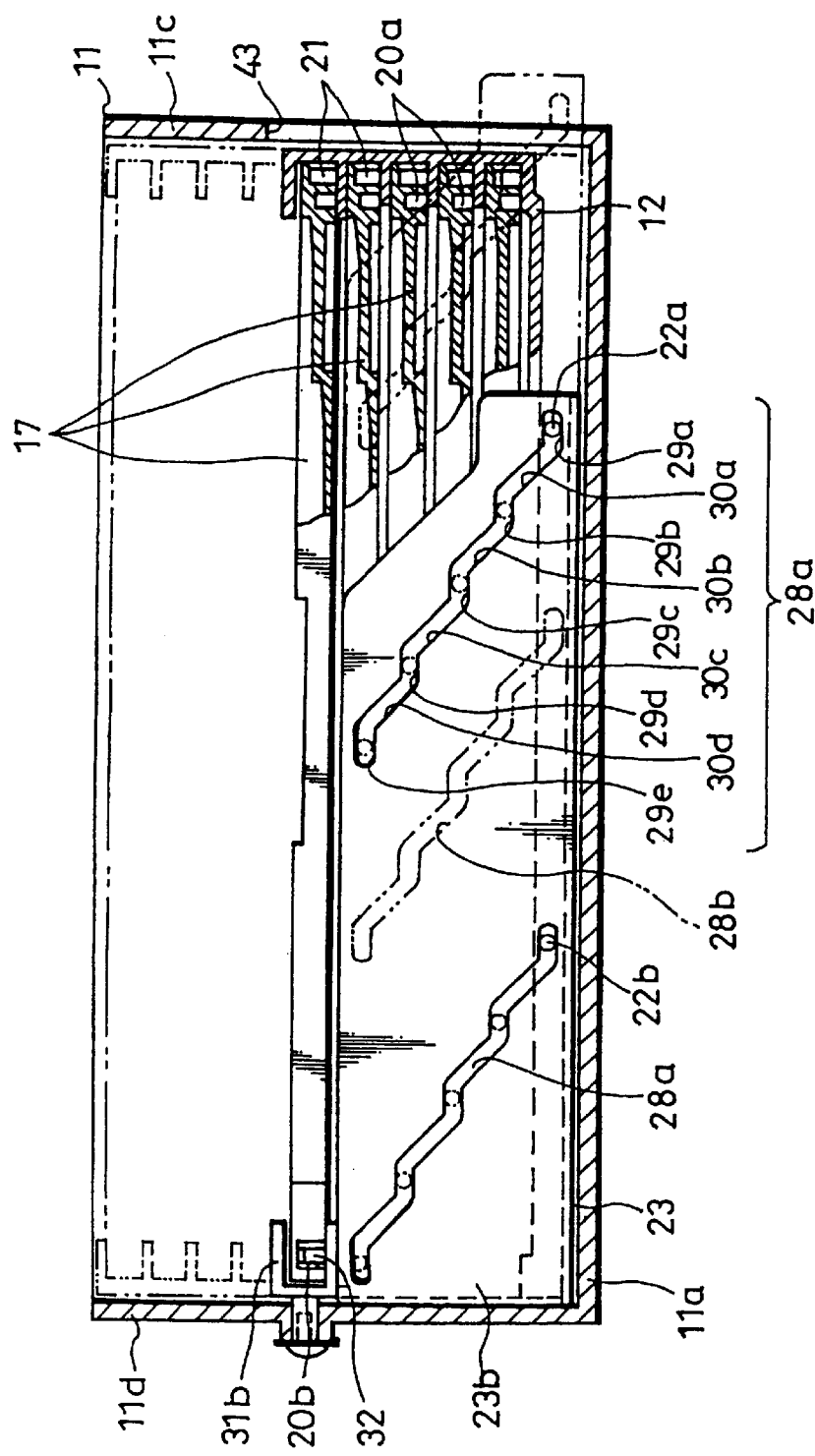
FIG. 6 is a cross-sectional view of the disc player apparatus shown in FIG. 2 and which is taken along the line Y—Y in FIG. 3.
Figure 7:
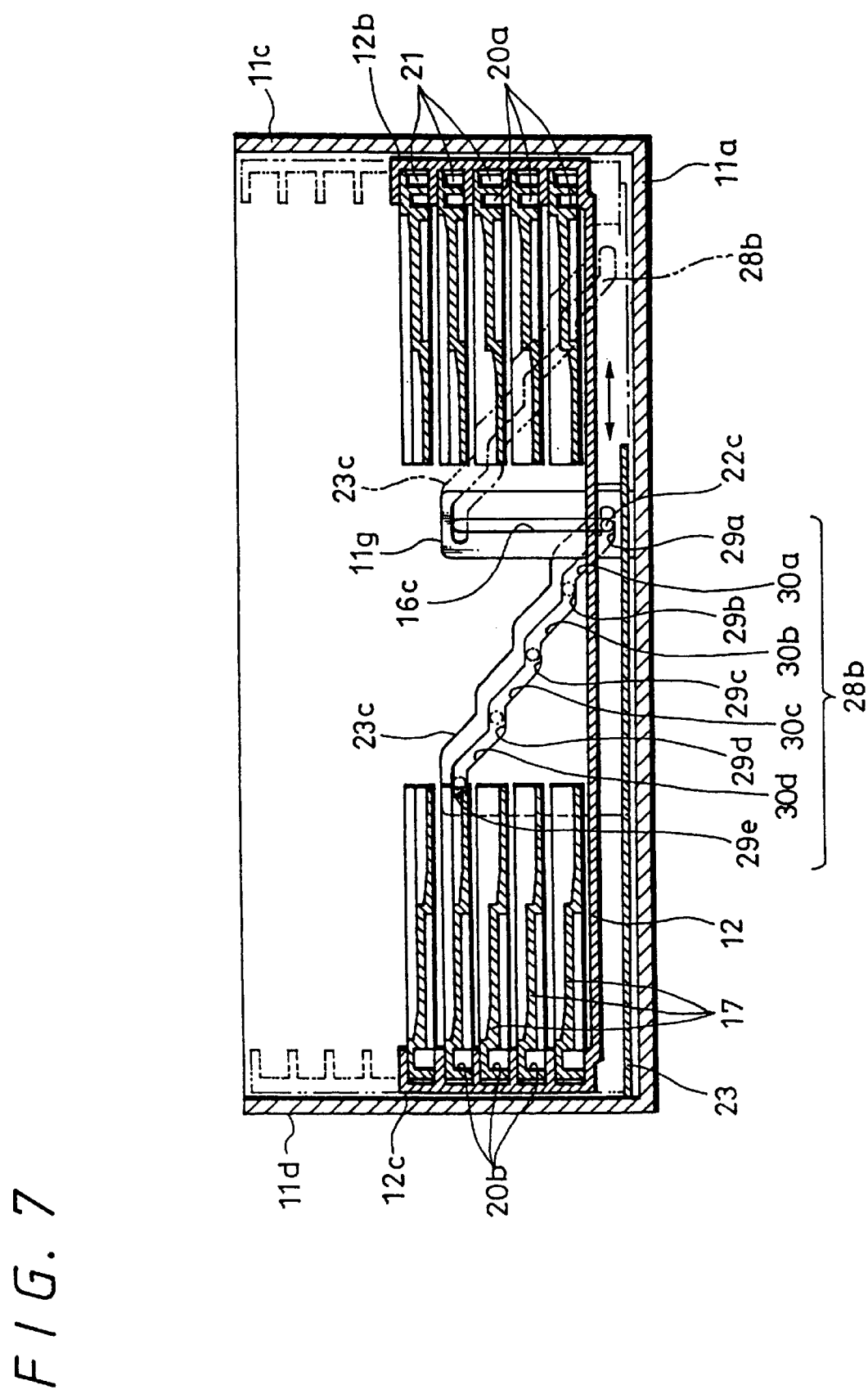
FIG. 7 is a cross-sectional view of the disc player apparatus shown in FIG. 2 and which is taken along the line Z—Z in FIG. 3.
Figure 8:
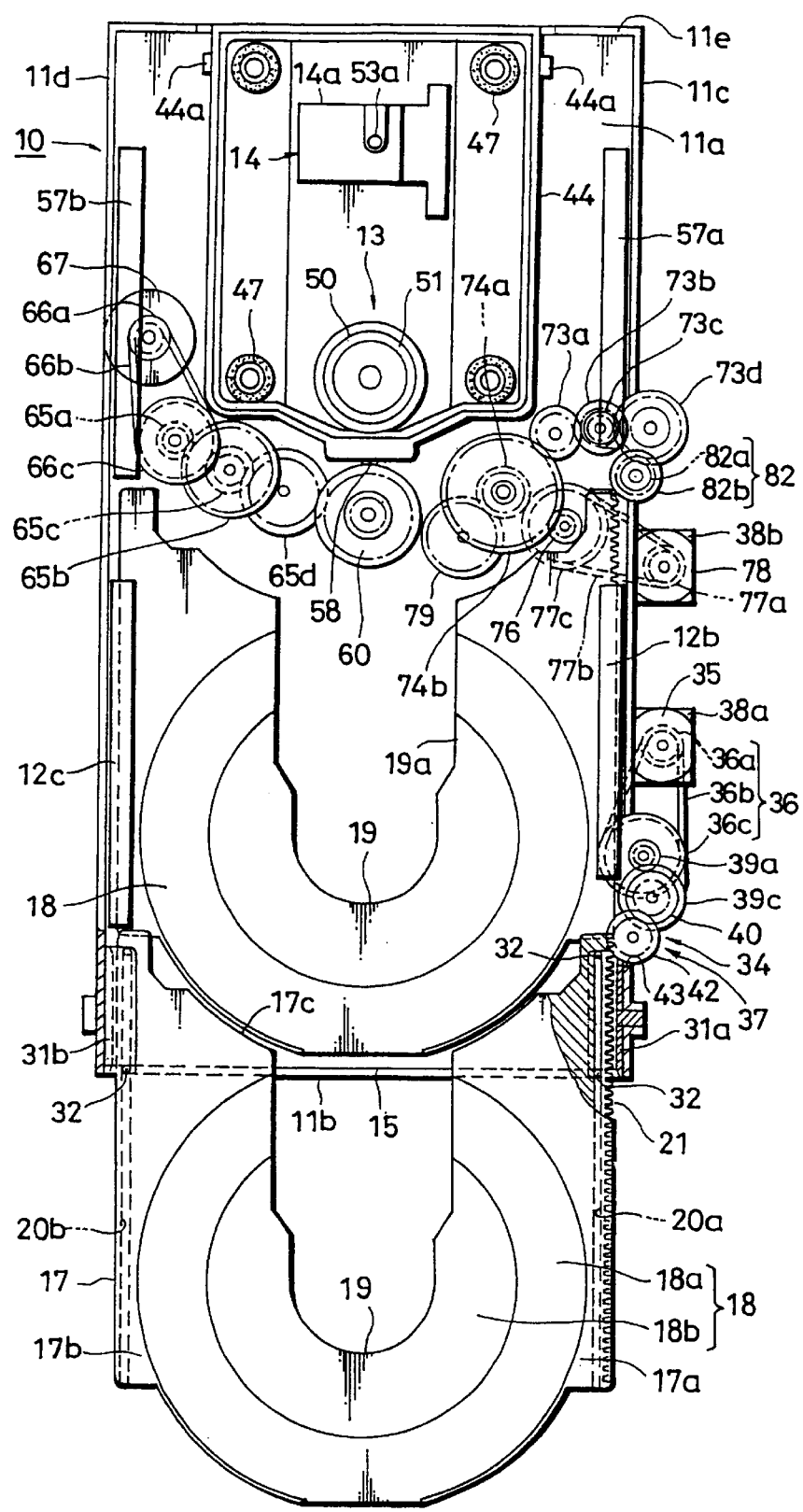
FIG. 8 is a front view showing the eject state of the disc player apparatus shown in FIG. 2.
Figure 9:
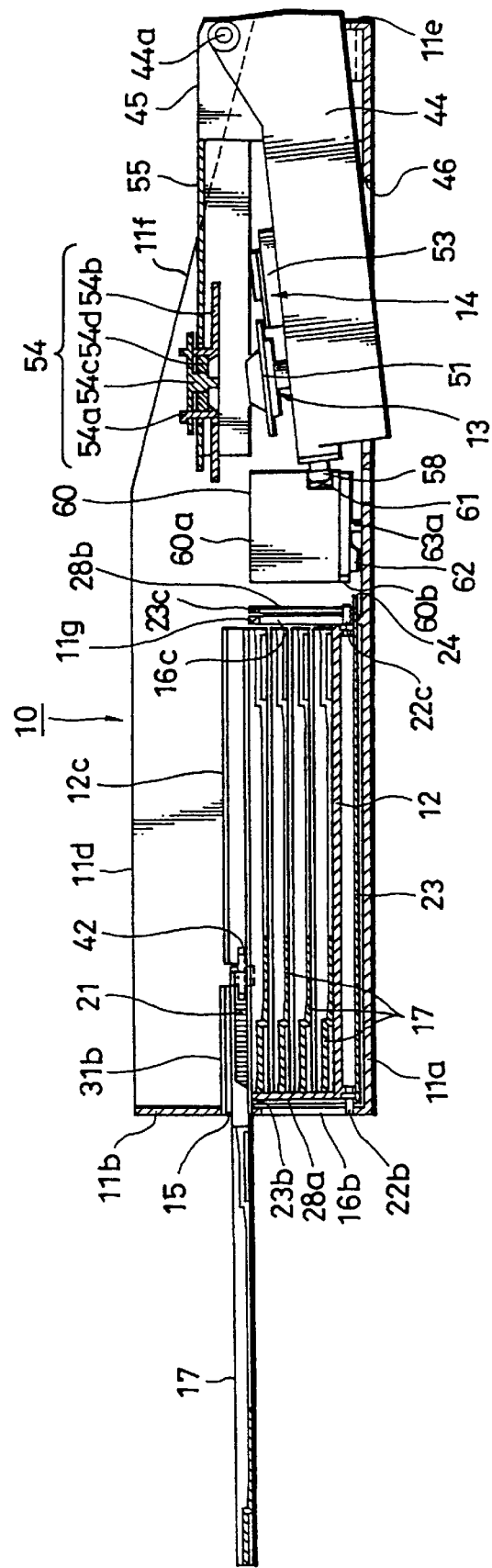
FIG. 9 is a cross-sectional view of FIG. 8 corresponding to the portion taken along the line X—X in FIG. 3 of the disc player apparatus shown in FIG. 2.

As shown in FIGS. 6 and 7, on the front elevation plate portion 23b of the slide plate 23, there are parallelly formed two elevation cam grooves 28a, 28a. On the rear elevation plate portion 23c, there is formed one elevation cam groove 28b. These three cam elevation grooves 28a, 28b are formed of rectangular holes of staircase shapes having the same shape and size. The three guide pins 22a to 22c of the tray holder 12 are slidably inserted into the respective guide pins 22a to 22c. That is, the two guide pins 22a, 22b formed on the front potion o the tray holder 12 are inserted into the two elevation cam grooves 28a of the front elevation plate portion 23b. The guide pin 23c formed at the rear portion of the tray holder 12 is inserted into the elevation cam groove 28b of the rear elevation plate portion 23c.

These elevation cam grooves 28a, 28b include five horizontal portions 29a to 29e formed at a predetermined interval in the upper and lower direction and four inclined portions 30a to 30d obliquely communicated with the upper and lower horizontal portions. The five horizontal portions 29a to 29e are formed at a similar interval in response to the five tray housing portions of the tray holder 12. The above-mentioned tray entrance 15 is formed in response to this tray holder 12. That is, when the guide pins 22a to 22c inserted into the elevation cam grooves 28a, 28b are located at the horizontal portion 29a of the first stage of the lowermost stage, the tray housing portion of the uppermost stage of the tray holder 12 becomes coincident with the tray entrance 15. When the guide pins 22a to 22c are translated into the horizontal portion 29e of the fifth state of the uppermost stage, the tray holder 12 is elevated so that the tray housing portion of the lowermost stage becomes coincident with the tray entrance 15.

The elevation operation of this tray holder 12 is executed by the vertical grooves 16a, 16b formed on the front surface plate portion 1ib of the mechanical chassis 11 and the vertical groove 16c formed on the elevation guide member 11g erected on approximately the central portion of the bottom surface plate portion 11a. The tip end portions of the two front guide pins 22a, 22b which penetrate the two elevation cam grooves 28a of the front elevation plate portion 23b are slidably inserted into the two vertical grooves 16a, 16b, and a tip end portion of the guide pin 22c which penetrates the elevation cam groove 28b of the rear elevation plate portion 23c is slidably inserted into the vertical groove 16c.

Accordingly, while the tray holder 12 is supported to the mechanical chassis 11 in such a manner that it can be elevated only in the upper and lower direction, the slide plate 23 is supported to the mechanical chassis 11 in such a manner that it can be translated only in the left and right direction. When this slide plate 23 is translated in the lateral direction, the tray holder 12 is elevated in the upper and lower direction through an action of a holder elevation mechanism comprising the vertical grooves 16a to 16c and the guide pins 22a to 22c and the elevation cam grooves 28a, 28b.

In order that the disc tray 17 housed in this tray holder 12 may be reliably and easily inserted into and ejected from the tray entrance 15, as shown in FIG. 2 or 3, on left and right sides of the tray entrance 15 there are provided front guide rails 31a, 31b. These front guide rails 31a, 31b are shaped as U-letter in cross-section, and fastened to the inner surfaces of the side surface plate portions 11c, 11d of the mechanical chassis 11 by attachment screws 31c in such a manner that opening sides thereof are opposed to each other and that their shaft portions are engaged into attachment apertures of the side surface plate portions 11c, 11d. As shown in FIG. 4, guide protrusions 32, which are protruded in the upper direction, are formed on the lower surface members of the respective front guide rails 31a, 31b. Upon ejection, these guide protrusions 32 are entered into the left and right guide grooves 20a, 20b of the disc tray 17 to restrict the movement direction of the disc tray 17 so that the disc tray may be moved smoothly.

As shown in FIG. 2, in order that the disc tray 17 may be inserted into and ejected from the tray entrance 15, a tray insertion and eject mechanism 34 is provided at the front portion of the side surface plate portion 11c of the mechanical chassis 11. This tray insertion and eject mechanism 34 comprises a motor 35 serving as a driving source, a deceleration mechanism 36 for decreasing the revolution number of the motor 35 to thereby increase a transmission torque and an oscillation gear mechanism 37 which is oscillated by a torque transmitted from the deceleration mechanism 36 to connect and disconnect the output gear of the tip end and the rack 21 of the disc tray 17. The motor 35 of the tray insertion and eject mechanism 34 is mounted on and fixed to a motor base portion 38a expanded on the outer surface of the side surface plate portion 11c in the lateral direction.

The deceleration mechanism 36 for transmitting a rotation force of the motor 35 comprises a drive pulley 36a attached to the rotary shaft of the motor 35, an endless power transmission member 36b formed of a rubber loop or the like one side of which is extended to this drive pulley 36a and a follow-up pulley 36c to which the other side of the power transmission member 36b is extended. The follow-up pulley 36c is integrally formed with a drive gear 39a which forms a part of the oscillating gear mechanism 37. A shaft 39b is penetrated into the central portions of these portions. This shaft 39b is supported at its both ends by a shaft bearing member 11h (upper shaft bearing member is not shown) formed on the side surface plate portion 11c. The drive gear 39a is meshed with a follow-up gear 39c.

The follow-up gear 39c has a sun gear 40 integrally formed therewith, and the sun gear 40 is rotatably supported to a support shaft 40a attached to the side surface plate portion 11c in a cantilever fashion. To the support shaft 40a, there is rotatably supported one end of an oscillating arm 41. At the intermediate portion of this support shaft, there is attached a support shaft 41a in a cantilever fashion. To this support shaft 41a, there is rotatably supported a planet gear 42 which is meshed with the sun gear 40. In response to the rotation direction of the sun gear 40, the planet gear 42 is approached to or detached from the rack 21 of the disc tray 17. In order to assure that the planet gear 42 and the rack 21 are meshed with each other and in order that the follow-up pulley 36c or the like can be insulated, an opening portion 43 of a proper size is provided on the side surface plate portion 11c of the mechanical chassis 11.

Further, as shown in FIG. 5, the other end of the oscillating arm 41 is protruded onto the disc tray 17, and its tip end portion forms a stopper portion 41b which restricts the movement of the disc tray 17 located just below the disc tray 17 located at the height of the eject position. At the stopper portion 41b of the oscillating arm 41, there is formed a restriction pin 41c which is entered into one guide groove 20a of the disc tray 17 when this stopper portion 41b is moved in the front of the disc tray 17 to restrict the movement of the disc tray. By restricting the movement of the oscillating arm 41 with this restriction pin 41c, when this restriction pin 41c is located within the guide groove 20a, a meshed relationship of the plate gear 42 and the rack 21 can be maintained in such a manner that planet gear is meshed with the rack regardless of the rotation direction of the motor 35.

Thus, in FIG. 3, when the motor 35 is rotated in the clockwise direction, the planet gear 42 is moved around the sun gear 40 in the counter-clockwise direction to detach the oscillating arm 41 from the disc tray 17, and the stopper portion 41b and the restriction pin 41c are evacuated to the outside from the front of the movement direction of the disc tray 17. On the other hand, when the motor 35 is rotated in the counter-clockwise direction, the planet gear 42 is moved around the sun gear 40 in the clockwise direction to cause the oscillating arm 41 to approach to the disc tray 17. At the same time, the stopper portion 41b is moved to the front of the disc tray 17 located below the stopper portion to thereby hinder the movement of the disc tray 17, and the restricting pin 41c is moved to the front of the guide groove 20a of the disc tray 17 to be translated. At that time, the plane gear 42 is meshed with the rack 21. Thereafter, when the planet gear 42 is rotated in the counter-clockwise direction, the rotation force of the planet gear 42 is transmitted to the rack 21 to translate the disc tray 17 in the front direction so that the tip end portion of the disc tray 17 is protruded from the tray entrance 15.

At the rear of the disc reproducing apparatus 10 of the tray holder 12 in which a plurality of disc trays 17, which are inserted and ejected as described above, are housed, there is disposed a swing frame 44 which is swingably supported to the mechanical chassis 11. As shown in FIGS. 2 to 4, the swing frame 44 is formed of a frame member of approximately square shape. On the rear upper portion of the swing frame 44, there is provided a rotary shaft portion 44 which becomes the rotation center against the mechanical chassis 11. This rotary shaft portion 44a is rotatably supported by a pair of left and right support brackets 45 fixed to the mechanical chassis 11, accordingly, the swing frame 44 can be freely inclined downward relative to the mechanical chassis 11 in the front direction.

In order to maintain the inclining operation of this swing frame 44, an opening window 46 having substantially the same shape as that of the front side of the swing frame 44 is provided on the bottom surface plate portion 11a of the mechanical chassis 11, and a recess 46a is formed in the rear surface plate portion 11e. As sown in FIGS. 4 and 12 or the like, while the rear surface of the swing frame 44 is constantly located at the recess portion 46a, the front lower portion of the swing frame 44 is downwardly protruded from the opening window 46 only when the swing frame is inclined downward in the front direction, i.e. upon non-loading.

Figure 12:
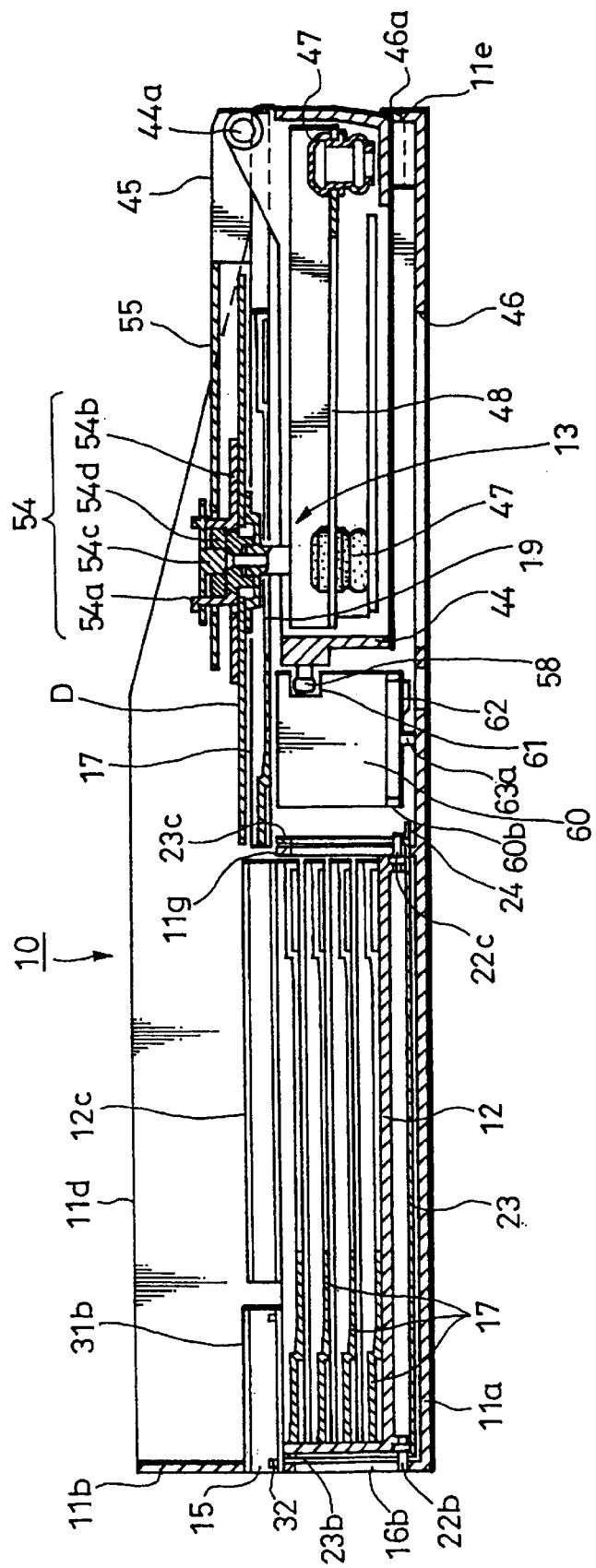
FIG. 12 is a cross-sectional view corresponding to FIG. 11 and showing the play state of the disc player apparatus shown in FIG. 2.

To the inside of the swing frame 44, there is resiliently supported a sub-chassis 48 through four shock-absorbing members 47 as shown in FIGS. 2 and 3. The disc rotation drive apparatus 13 and the optical pickup apparatus 14 are mounted on this sub-chassis 48. As shown in FIG. 12 or the like, each shock-absorbing member 47 is formed of a hollow cylindrical material made of a rubber-like resilient material. When the sub-chassis 48 is resiliently supported by the four shock-absorbing members 47, the vibration on the mechanical chassis 11 side can be prevented from being transmitted to the disc rotation drive apparatus 13 or the like.

The disc rotation drive apparatus 13 includes a spindle motor 50 fixed to the front portion of the sub-chassis 48, and a turntable 51 is attached to the tip end portion of the rotary shaft set in the upper direction of the spindle motor 50. This turntable 51 is set in substantially parallel to the upper surface of the sub-chassis 48, and the upper surface central portion thereof has a centering guide 51a to which there is engaged a center hole of the optical disc D.

In the rear of this spindle motor 50, there is supported the optical pickup apparatus 14 which can be translated by two guide shafts 52, 52 in the front and rear direction. The two guide shafts 52 are made parallel to each other, and both ends thereof are fixed to the sub-chassis 48. A carriage 14a of the optical pickup device 14 that is slidably supported to this guide shafts 52 is arranged such that it can be approached to and detached from the spindle motor 50 in the radius direction of the optical disc D.

To the upper portion of this carriage 14a, there is attached an optical head 53 in which an objective lens 53a is located upwardly. Laser beam emitted from this objective lens 53a is irradiated on the information recording surface of the optical disc D chucked by the turntable 51 and a disc clamper 54 described later on, and laser beam reflected from its information recording surface is introduced from this objective lens 53a into the optical head 53. Respective centers of the objective lens 53a and the spindle motor 50 are set on the movement trace of the center of the disc tray 17. In the rear portion of the optical disc D loaded onto the turntable 51, the objective lens 53a can be moved in the front and rear direction parallel to the radius direction of the optical disc D.

Above the turntable 51, there is disposed the disc clamper 54 for holding the optical disc D between it and the turntable 51. As shown in FIGS. 3 and 4, this disc clamper 54 is supported to a clamper supporting plate 55 secured to the tip end side of the supporting bracket 45 so as to cover the upper portion of the swing frame 44 in such a manner that it can be freely moved within a constant range in the upper and lower direction, the right and left direction and in the front and rear direction.

That is, the disc clamper 54 includes a cylindrical shaft portion 54a which penetrates the hole defined in the damper supporting plate 55 in the upper and lower direction, a flange-like press plate 54b provided at the lower end portion of this cylindrical shaft portion 54a and an attachment plate 54c detachably attached to the upper end portion of the cylindrical shaft portion 54a. The cylindrical shaft portion 54a houses therein a chucking magnet 54d. By an adsorption force of this magnet 54d, the disc damper 54 is adsorbed to the turntable 51. Thus, the optical disc D centered by the centering guide 51a is chucked to the turntable 51 and made integral therewith in the rotation direction.

As shown in FIG. 2 or the like, the left and right side portions of damper supporting plate 55 there are provided guide rails 57a, 57b for supporting both side portions of the disc tray 17 transported from the rear portion of the tray holder 12 to the turntable 51 side. Thereafter, the guide rails 57a, 57b are shaped as U-letter in cross-section similarly to the front guide rails 31a, 31b and the tray housing portion of the tray holder 12 and are set with heights substantially the same as those of them. Incidentally, the reinforcing rib 11j located among the front guide rails 31a, 31b, the rear guide rails 57a, 57b and the tray holder 12 has a recess for allowing each disc tray 17 to pass therethrough.

Figure 18:
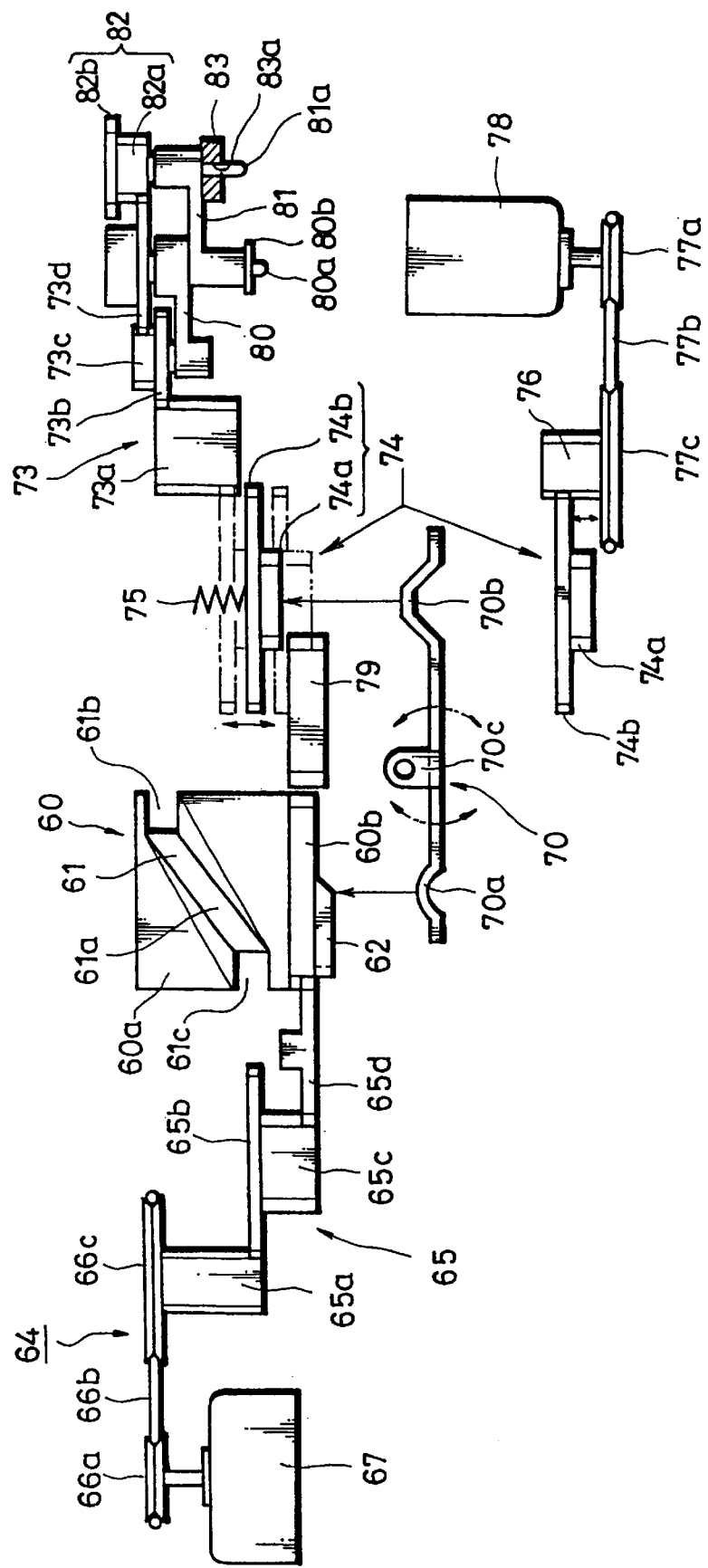
FIG. 18 is an explanatory diagram showing a meshed state of FIG. 17 of the disc player apparatus shown in FIG. 2.
Figure 19:
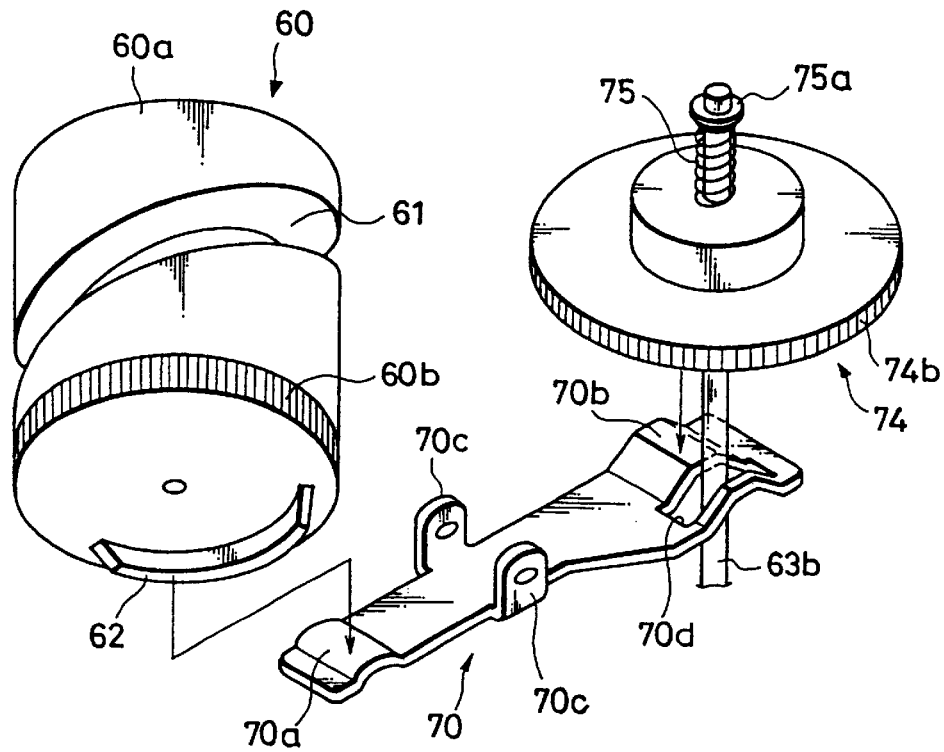
FIG. 19 is an explanatory diagram showing a relationship among the cam member, a swing lever and a movable gear of the disc player apparatus shown in FIG. 2.

At the central upper portion of the front surface of the above-mentioned swing frame 44, there is provided a cam pin 58 which is protruded in the front direction. The tip end portion of the cam pin 58 is shaped as a spherical form so as to reduce a sliding frictional resistance. This cam pin 58, in particular, the spherical-shaped portion is slidably engaged with a cam groove 61 of a cam member 60 disposed on the front of the cam pin 58. As shown in FIGS. 18 and 19, this cam portion 60 includes a cylindrical cam 60a having the cam groove 61 spirally extended on the outer peripheral surface, a cam gear 60b provided on the lower end portion of the cylindrical cam 60a and an arcuate cam 62 provided on the lower surface of the cam gear 60b.

Figure 20:
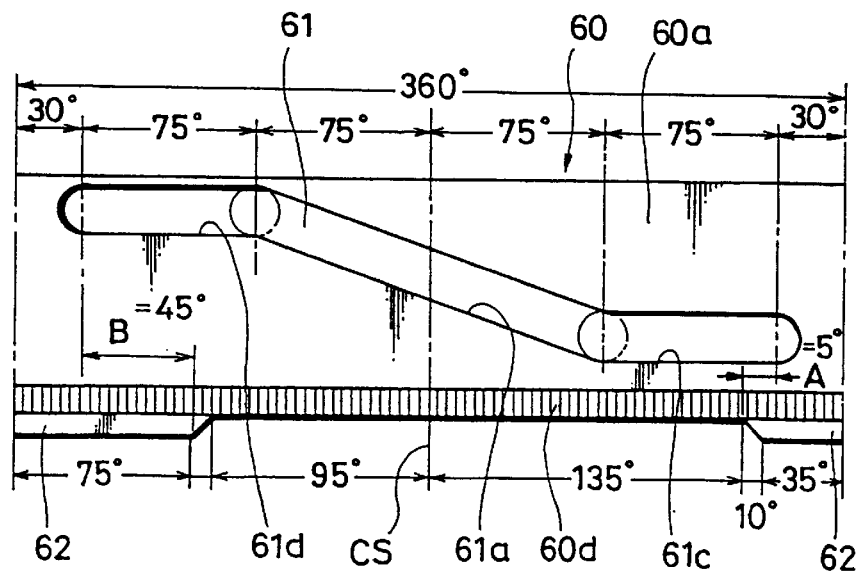
FIG. 20 is an explanatory diagram showing a relationship among the cam groove and a rotary cam of the cam member of the disc player apparatus shown in FIG. 2.

The cam groove 61 of the cylindrical cam 60a is shaped as shown in a cam expanded diagram of FIG. 20. In FIG. 20, reference symbol CS depicts a central position of the cam groove 61. There is provided an inclined portion 61a which is extended in the oblique direction with a predetermined angular extent (75°) from this central position CS to the left and right sides. The inclined portion 61a of this cam groove 61 is shaped as a rectangular groove which is inclined down in the right-hand direction. At the high position on the left-hand side of this inclined portion 61a, there is formed an upper horizontal portion 61b. At the lower position of the right-hand side of the inclined portion 61a, there is formed a lower horizontal portion 61c.

The upper and lower horizontal portions 61b, 61c of this cam groove 61 are extended with predetermined angular extents (both angular extents are 75° in this embodiment) at the left and right sides along the horizontal direction, accordingly, the portion without the cam groove is set at 60°. The upper horizontal portion 61b of this cam groove 61 is set at a height substantially the same obtained when the swing frame 44 is disposed in the horizontal direction. As a result, the swing frame 44 is inclined down in the front direction by an inclination angle corresponding to a height difference between the upper horizontal portion and the lower horizontal portion 61c. Relative to the cam groove 61, the arcuate cam 62 provided on the lower side of the cam gear 60b is set in the following relationship.

That is, in this embodiment, the arcuate cam 62 is raised from the central position CS with an inclination angle of 95° on the left-hand side and is also raised from the position of 135° on the right-hand side. After a chamfered portion having an inclination angle of 10° was formed, the cam portion is contiguous to both sides. Accordingly, the arcuate cam 62 is set in an angular extent of 110° (130° if the chamfered portion is taken into consideration) at the position opposite to the inclined portion 61a of the cam groove 61. On the depth of the lower horizontal portion 61c of the cam groove 61, there is set an arcuate cam operation area A having an inclination angle of 5°. In the depth of the upper horizontal portion 61b, there is set an arcuate cam operation area B having an inclination angle of 45°.

Figure 17:
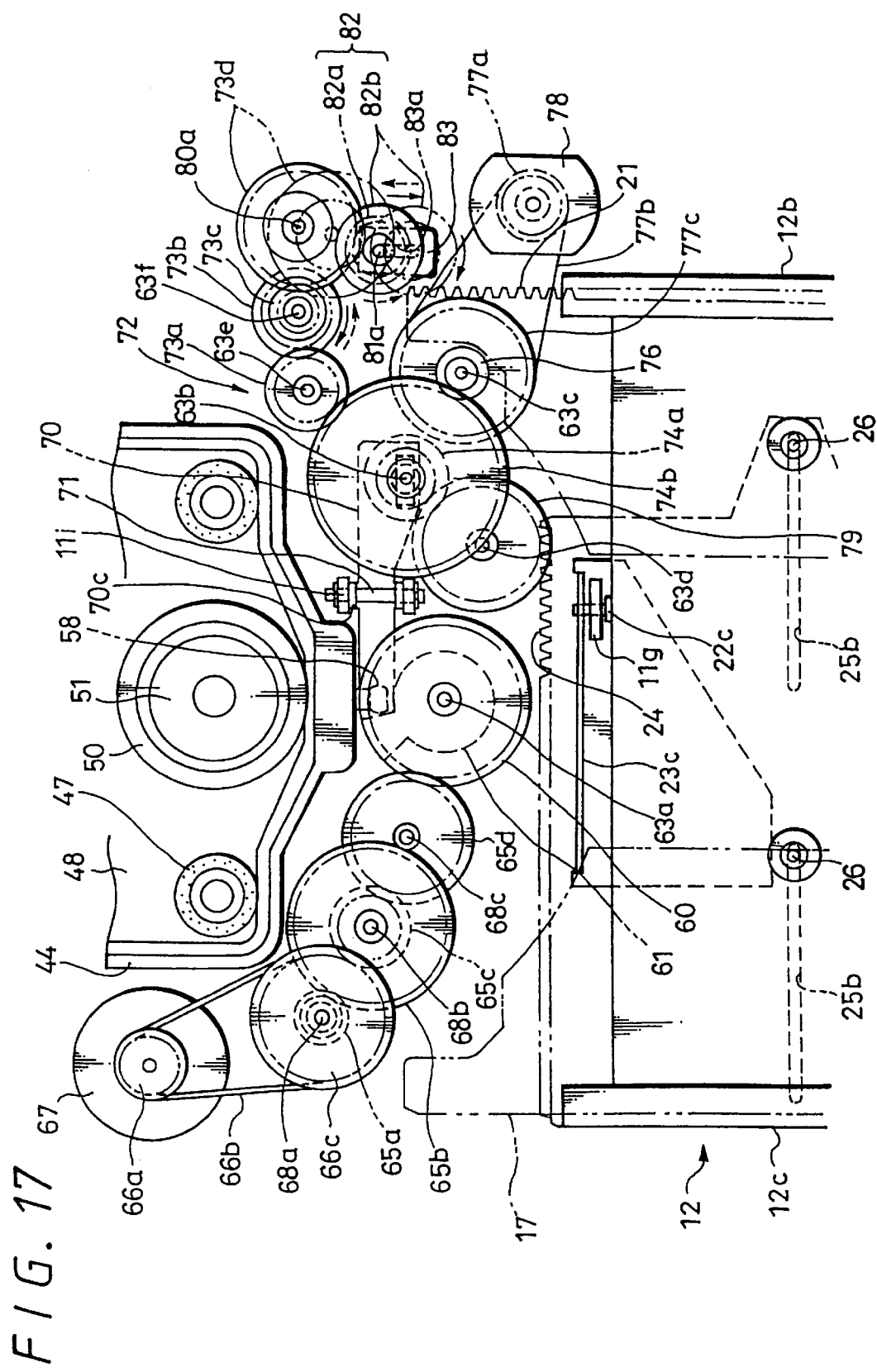
FIG. 17 is an explanatory diagram showing the portion near the cam member of FIG. 3 of the disc player apparatus shown in FIG. 2 in an enlarged scale.

The cam member 60 thus arranged is rotatably supported to the support shaft 63a erected on the bottom surface plate portion 11a of the mechanical chassis 11 under the condition that the arcuate cam 62 is disposed in the lower direction as shown in FIG. 4. As shown in FIGS. 17 and 18, the cam gear 60b of the cam member 60 is constantly meshed with an output gear 65d which is located at the end of a cam drive gear train 65 of the cam drive mechanism 64. This output gear 65d is meshed with an intermediate small-diameter gear 65c located at the intermediate position of the cam drive gear train 65. An intermediate large-diameter gear 65b is integrally formed with this intermediate small-gear 65c. A drive gear 65a is meshed with the intermediate large-gear 65b.

A follow-up pulley 66c is integrally formed with this drive gear 65a. One end of a power transmission member 66b made of an endless rubber belt or the like is extended to this follow-up pulley 66c. The other end of this power transmission member 66b is extended to a drive pulley 66a, and the drive pulley 66a is fixed to a rotary shaft of a cam drive motor 67. The cam drive motor 67 is fixed to the mechanical chassis 11 through a motor bracket, not shown. The drive gear 65a, the intermediate gears 65b, 65c and the output gear 65d are rotatably supported to support shafts 68a, 68b, 68c erected on the bottom surface plate portion 11a, respectively.

As shown in FIGS. 17, 18 and 19, into the lower side of the arcuate cam 62, there is inserted an input portion 70a of a swing lever 70 rotatably supported-to the bottom surface plate portion 11a. This swing lever 70 is comprised of a seesaw-like member having a pair of shaft bearing members 70c, 70c provided at both sides of the width direction of the intermediate portion of the longitudinal direction. The shaft bearing portions 70c are interposed between a pair of supporting members 11i erected on the bottom surface plate portion 11a and both end portions of a rotary shaft 71 inserted into this shaft bearing member 70c are supported by the supporting members 11i, whereby the input portion 70a formed on one side thereof and an action portion 70b formed on the other side thereof can be swung in the upper and lower direction.

While the input portion 70a of the swing lever 70 is protruded in an arcuate fashion so as to come in contact with the arcuate cam 62 with ease or the like, the action portion 70b is protruded in a trapezoidal fashion so as to enable a pressure force to act positively or the like. Further, on the action portion 70b of the swing lever 70, there is formed a rectangular hole 70d into which the support shaft 63b erected on the bottom surface plate portion 11a is inserted with a predetermined clearance. Above the action portion 70b, there is disposed a movable gear 74 which is rotatably supported to the support shaft 63b. This movable gear 74 is spring-biased by a spring force of a coil spring 75 and thereby urged against the upper surface of the action portion 70b. One end of the coil spring 75 is supported by a retaining ring 75a engaged with the tip end portion of the support shaft 63b, thereby retaining the coil spring 75.

Accordingly, the movable gear 74 is guided by the support shaft 63b and thereby can be moved by a predetermined distance in the upper and lower direction. This movable gear 74 is located at the end of a tray conveying gear train 73 comprising a part of a tray conveying mechanism 72. The movable gear comprises a small-diameter gear portion 74a disposed on the swing lever 70 side and a large-diameter gear portion 74b integrally formed with this small-diameter gear portion 74a. The other end of the coil spring 75 is fastened to the large-diameter gear portion 74b.

As shown in FIG. 17 or 18, the large-diameter gear portion 74b of the movable gear 74 is constantly meshed with a drive gear 76 in a movement range of the large-diameter gear portion 74b. A follow-up pulley 77c is integrally formed with the drive gear 76, and one end of a power transmission member 77b made of an endless rubber belt or the like is extended to the follow-up pulley 77c. The other end of the power transmission member 77b is extended to a drive pulley 77a, and the drive pulley 77a is fixed to the rotary shaft of a tray conveying motor 78. This tray conveying motor 78 is fixed to a motor base portion 38b provided on the side surface plate portion 11c of the mechanical chassis 11, and the drive gear 76 is rotatably supported to the support shaft 763c erected on the bottom surface plate portion 11a.

Further, an elevation-side gear 79 is faced to the small-diameter gear portion 73a of the movable gear 74, and a conveying-side gear 73a is faced to the large-diameter gear portion 74b. These gears are arranged such that they are selectively meshed with each other when the swing lever 70 is swung. That is, while the elevation-side gear 79 is disposed under the small-diameter gear portion 74a, the conveying-side gear 73a is disposed above the large-diameter gear portion 74b. When the action portion 70b of the swing lever 70 is pressed down under spring force of the coil spring 75, the small-gear portion 73a is meshed with the elevation-side gear 79. On the contrary, when the action portion 70b is pressed upwardly against the spring force of the coil spring 75, the large-diameter gear portion 74b is meshed with the conveying-side gear 73a.

The swing lever 70, the arcuate cam 62 and the movable gear 74 constitute a drive route change-over mechanism. The swing operation of the swing lever 70 due to the drive route change-over mechanism is executed by the action of the arcuate cam 62 of the cam member 60.

That is, when the arcuate cam 62 sides on and downwardly presses the input portion 70a of the swing lever 70, as a reaction thereof, the action portion 70b is lifted to elevate the movable gear 74 against the spring-biasing force of the coil spring 75 so that the large-diameter gear portion 74b is meshed with the conveying-side gear 73a which is the gear of the conveying driving system. On the other hand, when the arcuate cam 62 is detached from the input portion 70a by the rotation of the cam member 60, the action portion 70b of the swing lever 70 is pressed downwardly under spring force of the coil spring 75, whereby the small-diameter gear portion 73a is meshed with the elevating-side gear 79 which is the gear of the elevation driving system.

The elevation side gear 79 is rotatably supported by the support shaft 63*d* erected on the bottom surface plate portion 11*a* and meshed with the rack 24 of the above-mentioned slide plate 23. On the other hand, the conveying-side gear 73*a* is rotatably supported to the support shaft 63*e* erected on the bottom surface plate portion 11*a* and meshed with the input gear 73*b*. This input gear 73*b* is integrally provided with the sun gear 73*c*, and the sun gear 73*c* is meshed with the planet gear 73*d*. The sun gear 73*c* is rotatably supported to the support shaft 63*f* erected on the bottom surface plate portion 11*a*. Also, as shown in FIGS. 17 and 18, a base end portion of a rotary link 80 is rotatably supported to the support shaft 63*f*.

A rotary shaft 80*a* is penetrated into the tip end portion of the rotary link 80 in the upper and lower direction, and the planet gear 73*d* is rotatably supported to the upper portion of the rotary shaft 80*a*. This rotary shaft 80*a* is penetrated into a base end portion of a translating link 81 disposed under the tip end portion of the rotary link 80, and the retaining ring 80*b* engaged with the lower end portion of the rotary link 80 can prevent the two links 80, 81 and the planet gear 73*d* from being detached. Further, a translating shaft 81*a* is penetrated into the tip end portion of the translating link 81 in the upper and lower direction, and a translating gear 82 is rotatably supported to the upper portion of the translating shaft 81*a*.

This translating gear 82 includes a small-diameter gear portion 82*a* meshed with the planet gear 73*d* and a large-diameter gear portion 82*b* integrally formed with this small-diameter gear portion 82*a*. The lower end portion of the translating shaft 81*a* is slidably engaged with a rectangular hole 83*a* of a guide plate 83 fixed to the mechanical chassis 11 side. The rectangular hole 83 of this guide plate 83 is elongated in the front and back direction, and the translating gear 82 can be translated along this rectangular hole 83*a* in the front and rear direction.

Thus, the planet gear 73*d* rotates while moving (revolving) around the sun gear 73*c* in response to the rotation direction of the sun gear 73*c* to thereby transmit a rotation force transmitted from the sun gear 73*c* to the translating gear 82. At that time, as shown by a solid line arrow in FIG. 17, when the sun gear 73*c* is rotated in the clockwise direction, the planet gear 73*d* is revolved around the sun gear 73*c* in the clockwise direction with the result that the translating link 81 is translated in the front direction by the pressing force of the rotary shaft 80*a* which supports the planet gear 73*d*. Thus, the translating shaft 81*a* and the translating gear 82 are moved while being guided by the rectangular hole 83*a* in the front direction so tat the large-diameter gear portion 82*b* is meshed with the rack 21 of the disc tray 17.

As a result, the rotation force of the planet gear 73*d* is transmitted through the small-diameter gear portion 82*a* from the large-diameter gear portion 82*b* to the rack 21 to thereby convey the disc tray 17 in the spindle motor 50 side rearwardly. Thus, there is completed a supply-side conveying process in which the disc tray 17 is conveyed by the tray conveying mechanism 72 from the housing portion of the tray holder 12 to the chucking position which is the disc loading portion (showing a specific example of the recording medium loading portion) of the disc rotation drive apparatus 13.

On the other hand, as shown by a broken line arrow in FIG. 17, when the sun gear 73*c* is rotated in the counter-clockwise direction, the planet gear 73*d* is revolved around the sun gear 73*c* in the counter-clockwise direction so that the translating link 81 is pulled in the backward by the movement force of the rotary shaft 80*a* which supports the planet gear 73*d*. Thus, the translating shaft 81*a* is pulled backwardly along the rectangular hole 83*a* to move the translating gear 82 backwardly, thereby resulting in the large-diameter gear portion 82*b* being translated backwardly and detached from the rack 21.

In this case, when the large-diameter gear portion 82*b* of the translating gear 82 is meshed with the rack 21 of the disc tray 17, i.e. the disc tray 17 is conveyed to a position at which the optical disc D can be held on the turntable 51 or at a position at which the optical disc D can be reproduced, the disc tray 17 is conveyed in the front direction by the rotation force of the large-diameter gear portion 82*b*, when the disc tray 17 is conveyed up to the housing portion of the tray holder 12, the large-diameter gear portion 82*b* is detached from the rack 21 and the rotation force transmitted to the large-diameter gear portion 82*b* cannot be transmitted to the rack 21 any more. Thus, there is completed the eject side conveying process in which the disc tray 17 is conveyed from the disc loading portion of the disc rotation drive apparatus 13 to the position at which the disc tray is housed in the tray housing portion of the tray holder 12 by the tray conveying mechanism 72.

Although plastic such as ABS resin and POM (polyacetal) or the like is suitable as materials of the mechanical chassis 11, the tray holder 12, the disc tray 17, the swing frame 44 and the cam member 60, there can be suitably applied not only other plastics but also a variety of materials such as metal materials such as aluminum alloy or the like which are used as assemblies of this kind. Although metal materials such as stainless steel or the like are suitable as materials of the slide plate 23 and the swing lever 70, there can be applied not only other metal materials but also plastic material such as ABS resin, POM or the like.

If the disc player apparatus 10 thus arranged is used by the following steps, then the loading and eject work of the optical discs D on and from the five disc trays 17, the selection of a desired one optical disc D from five optical discs D stacked on each disc stacking portion 18 of the five disc trays 17 stacked in the five layers and the reproduction of information such as musical performance or the like and the exchange work of the optical disc D held on the disc stacking portion 18 of other disc tray 17 during reproduction can be executed.

FIGS. 2 to 7 show the housed state of the disc tray 17 as the initial state of this disc player apparatus 10. In this tray housed state, the swing frame 44 is inclined down in the front direction so that a clearance large enough to receive one disc tray 17 is set between the turntable 51 of the disc rotation drive apparatus 13 held on this swing frame 44 and the disc clamper 54 supported to the clamper supporting plate 55. The tray holder 12 for holding five disc trays 17 is located at the lowermost end and the disc tray 17 of the uppermost stage at this time is opposed to the tray entrance 15.

After an electric power is supplied to the electrical system by turning the power switch on, of operation switch groups disposed on the front surface or the like of the mechanical chassis 11 though not shown, a tray operation switch is operated so that a desired disc tray 17 is moved in the front direction and thereby protruded from the tray entrance 15 in the front direction. At that time, when the disc tray 17 which is located at the fifth stage which is the uppermost stage, for example, is projected, the projection operation can be executed from this initial state as it is. However, when the disc tray 17 located at the lower stage of the fourth stage, before the disc tray 17 is projected, the elevation operation of the holder elevation mechanism, which will be described later on, becomes necessary.

When the tray operation switch is turned on, due to the action of a control apparatus, not shown, the tray eject motor 35 is driven to transmit the rotation force of this tray eject motor 35 from the drive pulley 36a through the power transmission member 36b, the follow-up pulley 36c, the drive gear 39a, the follow-up gear 39c and the sun gear 40 to the planet gear 42. At that time, since the sun gear 42 is rotated in the clockwise direction in FIG. 3 in response to the rotation direction of the tray eject motor 35, the planet gear 42 is moved around the outer periphery of the sun gear 40 in the clockwise direction similarly and entered into the inside of the mechanical chassis 11, thereby meshed with the rack 21 formed on the side edge of the disc tray 17.

At the same time, the stopper portion 41b at the tip end of the oscillating arm 41 which supports the planet gear 42 is moved in the front direction of the disc tray 17 located at the four stage to thereby block the movement of the disc tray 17. On the other hand, the restriction pin 41c formed at the tip end of the oscillating arm 41 is entered into the guide groove 20a of the disc tray 17 to be ejected and the rotation force of the planet gear 42 is transmitted to the rack 21. At that time, since the planet gear 42 is rotated in the counter-clockwise direction, the disc tray 17 is moved in the front direction by its rotation force.

Thus, the expanded portion 17a, 17b at both sides of the disc tray 17 are entered into the front left and right guide rails 31a, 31b set at the inside of the tray entrance 15. The guide protrusions 32, 32 formed on the respective front guide rails 31a, 31b are entered into the guide grooves 20a, 20b defined in the respective expanded portions 17a, 17b. Since both sides of the disc tray 17 are guided by these guide protrusions 32, 32, the disc tray 17 can be moved straight in the direction at which the disc tray is projected from the disc reproducing apparatus 10 smoothly.

When the disc tray 17 is passed through the front guide rails 31a, 31b, projected from the tray entrance 15 to the outside of the disc reproducing apparatus 10 and the tip end portion of the disc tray 17 is projected to the disc holding portion 18 by a predetermined projected amount large enough to hold the optical disc D, for example, a switch, not shown, is operated by the disc tray 17 and the driving of the tray eject motor 35 is stopped. This is the eject state shown in FIGS. 8 and 9. In this eject state, since substantially the whole of the disc holding portion 18 is exposed to the front of the tray entrance 15, the optical disc having the diameter of 8 cm can be easily loaded onto the small-diameter recess portion 18b of the disc holding portion 18, and the optical disc having the diameter of 12 cm can be easily loaded onto the large-diameter recess portion 18a.

After the desired optical disc D was loaded onto the disc holding portion 18 of the disc tray 17, when the tip end portion of this disc tray 17 is slightly pressed or when a tray operation switch, which is disposed on the disc reproducing apparatus 10, not shown, is operated, the tray eject motor 35 is rotated in the direction opposite to the rotation direction in which the above-mentioned disc tray 17 is projected from the disc reproducing apparatus 10 so that the rotation force of this tray eject motor 35 is transmitted from the planet gear 42 to the rack 21.

At that time, since the planet gear 42 is rotated in the clockwise direction, although a force for coming away from the rack 21 acts on the planet gear 42, the restriction pin 41c formed at the tip end of the oscillating arm 41 which supports the planet gear 42 is slidably engaged into the guide groove 20a of the disc tray 17 so that the rotation force of the planet gear 42 can be transmitted to the rack 21 without detaching the planet gear 42 from the rack 21. The disc tray 17 is moved to the inside of the disc reproducing apparatus 10, i.e. moved in the backward, passed through the front guide rails 31a, 31b and returned to the tray housing portion of the tray holder 12. When the disc tray 17 is reached to the position at which the disc tray is housed in the tray holder 12, the driving of the tray eject motor 35 is stopped. This is the tray housed state shown in FIGS. 2 to 4.

Then, when the disc tray 17 in which the optical disc D from which reproduction of musical performance is desired is selected and the reproduction start switch, not shown, disposed in the disc reproducing apparatus 10 or the apparatus which can control the disc reproducing apparatus 10 is operated, by the control operation of the control apparatus, not shown, of the disc reproducing apparatus 10, the desire disc tray 17 designated by the user is conveyed to the rear disc loading portion side which is the further inside of the disc reproducing apparatus 10. Thereafter, the optical disc D loaded onto that disc holding portion 18 is chucked onto the turntable 51 of the disc rotation drive apparatus 13 by the disc clamper 54 and can be used for the reproduction of musical performance or the like.

Initially, when the reproduction start switch, not shown, is operated by the user, the tray conveying motor 78 of the tray conveying mechanism 72 is driven and the rotation force of this tray conveying motor 78 is transmitted from the drive pulley 77a through the power transmission member 77b and the follow-up pulley 77c to the drive gear 76. At that time, as shown in FIG. 4, since the swing frame 44 is inclined down in the front direction, the cam pin 58 formed at the tip end portion of the swing frame 44 is located in the arcuate cam operation area A (5( in this embodiment as shown in FIG. 20) set in the depth of the lower horizontal portion 61c of the cam groove 61 provided in the cylindrical cam 60a of the cam member 60. Therefore, since the arcuate cam 62 is sided on the input portion 70a of the swing lever 70 and the action portion 70b located at the opposite side of the input portion 70a is elevated with a pressure, the movable gear 74 is elevated against the spring-biasing force of the coil spring 75 so that the large-diameter gear portion 74 of the movable gear 74 is meshed with the conveying-side gear 73a.

As a result, since the drive gear 76 is constantly meshed with the large-diameter gear portion 74b of the movable gear 74, the rotation force transmitted to this drive gear 76 is transmitted from the large-diameter gear portion 74b through the conveying-side gear 73a, the input gear 73b, the sun gear 73c and the planet gear 73d to the small-diameter gear portion 82a of the translating gear 82. At that time, since the sun gear 73c is rotated in the clockwise direction as shown by the solid line arrow in FIG. 17 in response to the rotation direction of the tray conveying motor 78, the planet gear 73d meshed with the sun gear 73c is similarly rotated around the outer periphery of the sun gear 73c in the clockwise direction.

Thus, the translating link 81 one end of which is coupled to the rotary shaft 80a which supports the planet gear 73d is moved to the front side, and the translating shaft 81a provided at the other end of this translating link 81 is moved in the front direction straight along the rectangular hole 83a of the guide plate 83. As a result, as shown by a two-dot chain line in FIG. 17, the translating gear 82 is approached to the disc tray 17 and the large-diameter gear portion 82b of the translating gear 82 is meshed with the rack 21 of the disc tray 17. At that time, since the translating gear 82 is rotated in the clockwise direction, by the rotation force transmitted from the large-diameter gear portion 82b to the rack 21, the disc tray 17 is moved to the further inside, i.e., rearward of the disc reproducing apparatus 10.

Figure 10:
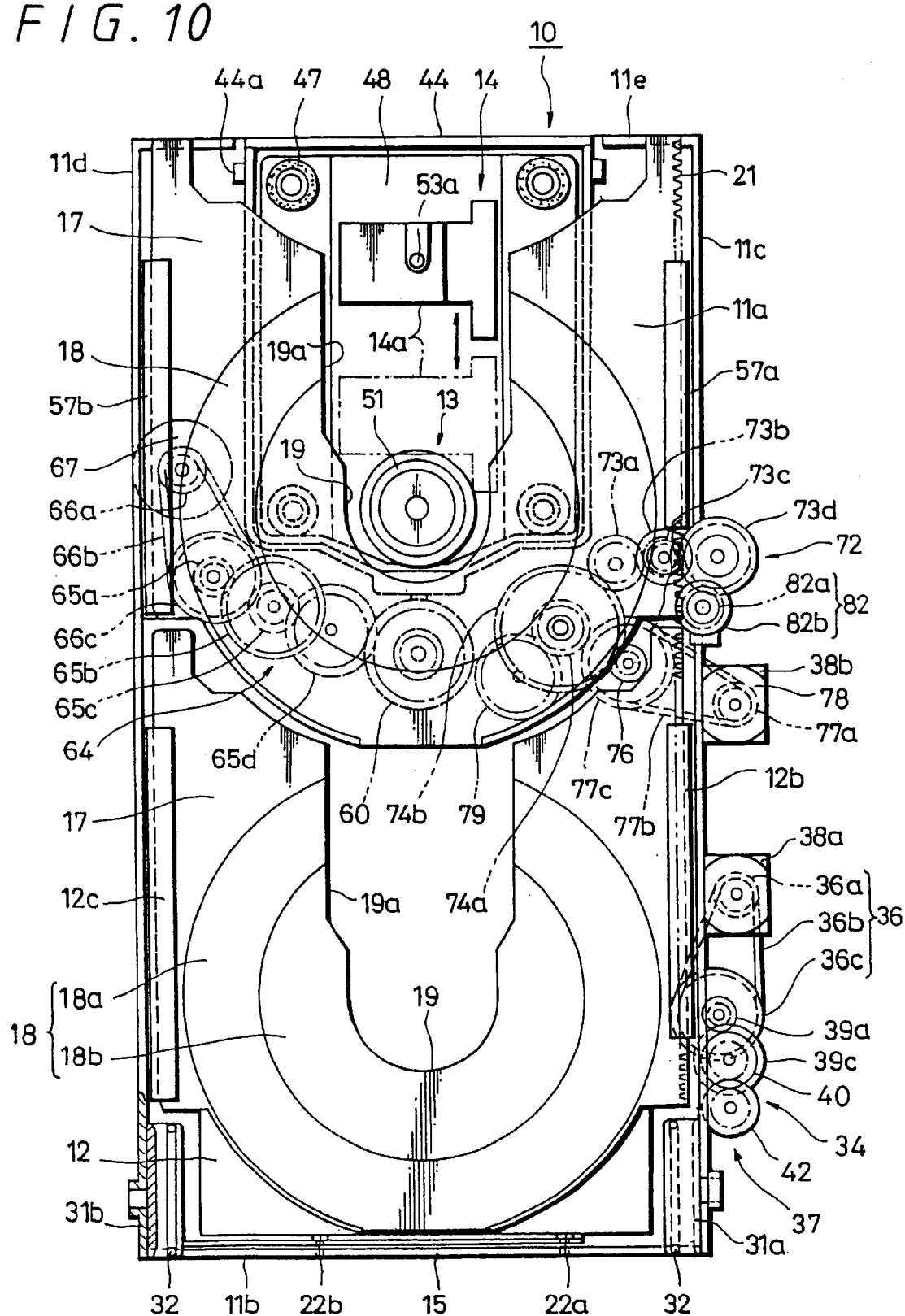
FIG. 10 is a plan view showing the manner in which the disc cartridge is conveyed to the disc loading apparatus of the disc player apparatus shown in FIG. 2.
Figure 11:
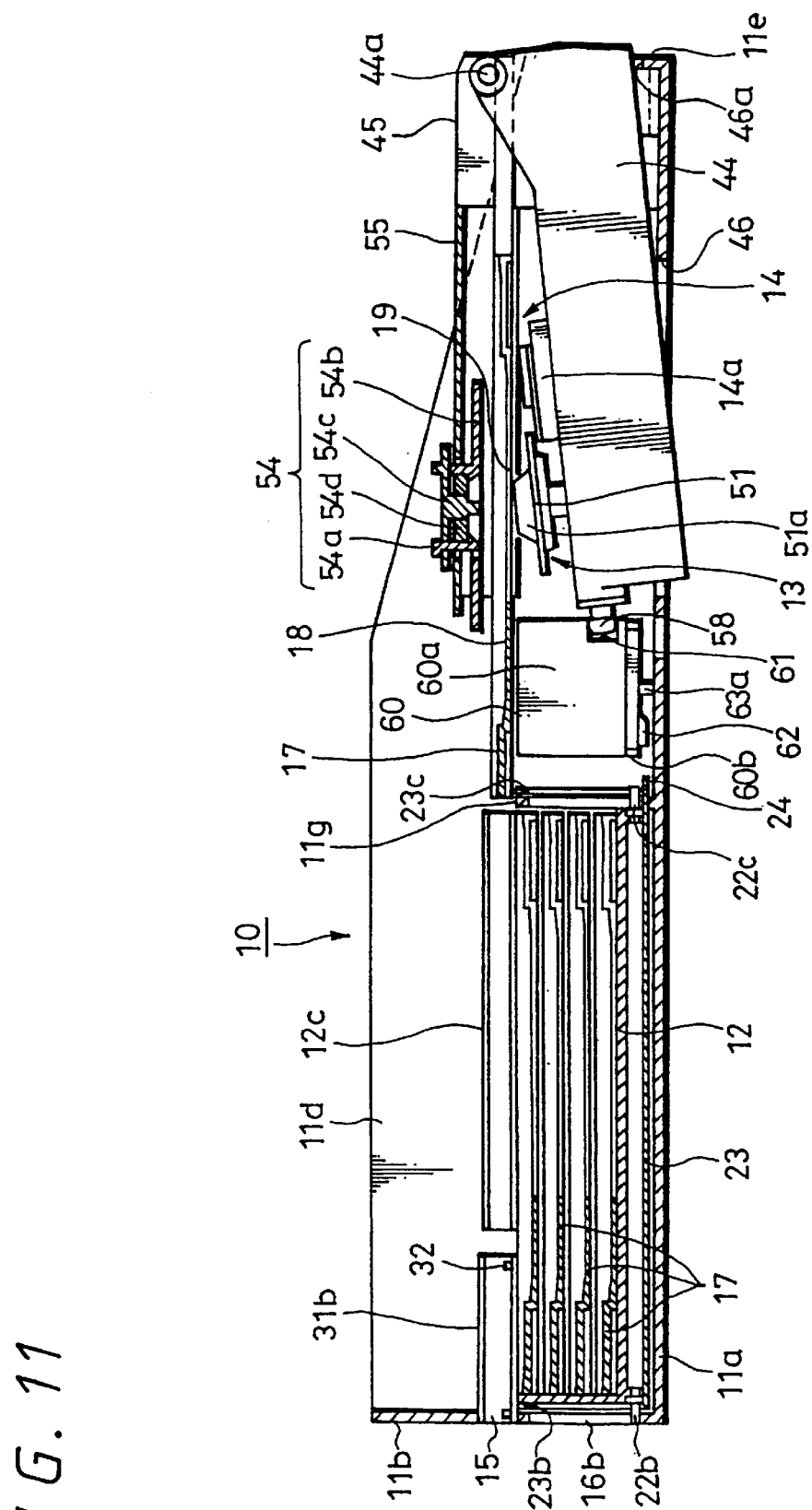
FIG. 11 is a cross-sectional view of FIG. 10 corresponding to the portion taken along the line X—X of FIG. 3 of the disc player apparatus shown in FIG. 2.

As shown in FIGS. 10 and 11, when the disc tray 17 is conveyed in the rearward by a predetermined amount and moved to the position at which the optical disc D can be held on the turntable 51 comprising the disc loading portion or to the position at which the optical disc D can be reproduced, the driving of the tray conveying motor 78 is stopped. It is detected by a switch, not shown, whether or not the disc tray 17 is reached to the position at which the optical disc D held on the disc tray 17 can be held on the turntable 51. It is sufficient to control the operation of the tray conveying motor 78 based on the detected output from this switch.

Then, the cam drive motor 67 of the cam drive mechanism 64 is driven, and the rotation force of this cam drive motor 67 is transmitted from the drive pulley 66a through the power transmission member 66, the follow-up pulley 66c, the drive gear 65a, the intermediate large-diameter gear 65b, the intermediate small-diameter gear 65c and the output gear 65d to the cam gear 60b. Thus, when the cam gear 60b is rotated, due to the rotation of the cam groove 61, the cam pin 58 moves the lower horizontal portion 61c of the cam groove 61 to the inclined portion 61a side. After the cam pin 58 is inserted into the inclined portion 61a and the cam pin 58 is progressively elevated in the upper direction by this inclined portion 61a, in response to the elevated amount of the cam pin 58, the swing frame 44 is rotated about the rotary shaft portion 44a in the upper direction, i.e. as shown in FIG. 12, rotated in the direction in which the optical disc D is pressed upwardly from the disc holding portion 18.

At that time, when the swing frame 44 is rotated in the upper direction, the spindle motor 50 supported to this swing frame 44 through the sub-chassis 48 is elevated progressively, and the turntable 51 provided on the swing frame 44 is inserted into the opening portion 19 defined at substantially the central portion of the disc tray 17. This turntable 51 is approached upwardly to the optical disc D held on the disc holding portion 18, and its centering guide 51a is inserted into the center hole of the optical disc D so that the centering guide 51a and the center hole of the optical disc D are engaged to elevate the optical disc D.

When the cam pin 58 is reached to the upper end of the inclined portion 61a, as shown in FIG. 12, the optical disc D held on the turntable 51 is placed in substantially the horizontal state. At the same time, the disc clamper 54 disposed above this turntable 51 is adsorbed to the turntable 51 by the adsorbing force of the incorporated magnet 54d. This is the chucking state shown in FIG. 12. As a result, the turntable 51 and the disc clamper 54 hold the optical disc D from the upper and lower sides, whereby the chucking operation of the optical disc D is completed.

When the cam pin 58 is entered from the inclined portion 61a to the upper horizontal portion 61b and moved to the depth of this upper horizontal portion 61b, the driving of the cam drive motor 67 is stopped and the rotation of the cam member 60 is stopped. At that time, the optical head 53 mounted on the carriage 14a of the optical pickup device 14 is entered into the opening portion 19a of the disc tray 17, and its objective lens 53a is approached to the information recording surface of the optical disc D. Concurrently therewith, the spindle motor 50 is driven and the optical disc D chucked to the turntable 51 is rotated at a predetermined speed, e.g. at a constant linear velocity.

Thereafter, the optical pickup device 14 is moved in the radius direction of the optical disc D toward the innermost peripheral direction of the information recording area of the optical disc D, and the optical head 53 reads an information signal recorded on the information recording surface of the optical disc D. Thus, the information read out by the optical head 53 is supplied from the optical pickup device 14 to an information reproducing circuit, and the signal read out from the optical disc D is reproduced by this information reproducing circuit, thereby resulting in a musical signal being outputted as a reproduced signal.

When the arcuate cam 62 is passed through the input portion 70a of the swing lever 70 and the cam pin 58 is detached from the arcuate cam operation area A of the lower horizontal portion 61c shown in FIG. 20, the restriction of the arcuate cam 62 on the input portion 70a is released. On the other hand, since the spring force of the coil spring 75 acts on the action portion 70b of the swing lever 70, the swing lever 70 is swung in the clockwise direction (direction shown by a broken line arrow) in FIG. 18. As a result, although the small-diameter gear portion 74a of the movable gear 74 is meshed with the elevating-side gear 79 under spring force of the coil spring 75, at that time, the tray conveying motor 78 is placed in the stop mode so that the elevating-side gear 79 can be prevented from being rotated.

The meshed state between the small-diameter gear portion 74a of the movable gear 74 and the elevating-side gear 79 is maintained until the cam pin 58 is detached from the arcuate cam operation area A of the lower horizontal portion 61c and entered into the arcuate cam operation area B of the upper horizontal portion 61b shown in FIG. 20 through the inclined portion 61a. When the cam pin 58 enters into the arcuate cam operation area B of the upper horizontal portion 61b, the input portion 70a of the swing lever 70 is pressed one more time by the arcuate cam 62 so that the swing lever 70 is swung in the counter-clockwise direction (direction shown by a solid line arrow) in FIG. 18. As a result, since the large-diameter gear portion 74b of the movable gear 74 is meshed with the conveying-side gear 73a against the spring force of the coil spring 75 and the meshed state between the small-diameter gear portion 74a and the elevating-side gear 79 is released, the elevating-side gear 79 can be prevented from being rotated.

During a certain optical disc D is reproduced, of other four disc trays 17, in order to select and eject any one disc tray 17 or in order to select and eject the disc tray 17 located at the stage lower than the fourth stage not but the fifth stage in the tray housed state shown in FIG. 4, if the user operates the tray operation switch, not shown, provided on the disc reproducing apparatus 10 corresponding to the disc tray 17 desired by the user, then the cam gear 60 is rotated slightly so that the cam pin 58 is released from the arcuate cam operation area B in the upper horizontal portion 61b or is released from the arcuate cam operation area A in the lower horizontal portion 61c. At that time, since the cam pin 58 is held within the upper horizontal portion 61b or within the lower horizontal portion 61c, the attitude of the swing frame 44 can be prevented from being changed due to the rotation of the cam member 60, thereby resulting in the horizontal state or the inclined state being maintained.

When the cam pin 58 is released from the arcuate cam operation area A or B in this manner, as described above, the small-diameter gar portion 74a of the movable gear 74 and the elevating-side gear 79 are meshed with each other through the swing operation of the swing lever 70. Thus, when the tray conveying motor 78 is driven in this state, the rotation force of the tray conveying motor 78 is transmitted from the drive pulley 77a through the power transmission member 77b, the follow-up pulley 77c, the drive gear 76, the large-diameter gear portion 74b and the small-gear portion 74a of the movable gear 74 to the elevating-side gear 79. Since this elevating-side gear 79 is meshed with the rack 24 of the slide plate 23 as shown in FIG. 17 or the like, by the rotation force transmitted from the elevating-side gear 79 to the rack 24, the slide plate 23 is translated in the lateral direction which is the tray conveying motor 78 side, i.e. in the direction substantially perpendicular to the direction in which the disc tray 17 is translated.

Thus, as shown in FIGS. 6 and 7, the elevating plate portions 23b, 23c provided on the front and rear of the slide plate 23 include step-like elevating cam grooves 28a, 28b which progressively increase their heights in the left-hand side. These elevating cam grooves 38a, 28b are slidably engaged with the guide pins 22a to 22c protruded in the front and rear of the tray holder 12. The movements of these guide pins 22a to 22c are restricted by the vertical grooves 16a to 16c defined in the mechanical chassis 11.

Therefore, when the slide plate 23 is moved in the above-mentioned lateral direction, the guide pins 22a to 2c are elevated with a pressure by the vertical grooves 16a to 16c and the elevating cam grooves 28a, 28b so that the tray holder 12 supported by these guide pins 22a to 22c at three points are elevated in substantially the upper vertical direction while it is maintained in substantially the horizontal state, i.e. in the direction parallel to the direction in which the disc trays 17 are stacked. The respective horizontal portions 29a to 29e of the elevating cam grooves 28a, 28b are opposed to the tray housing portions of the tray holder 12. Accordingly, when the guide pins 22a to 22c, for example, are moved from the horizontal portion 29a of the lowermost stage to the horizontal portion 29c of the third stage, the tray holder 12 is elevated by two stages and the tray housing portion located at the third stage from above the tray holder 12 is located with the same height as that of the tray entrance 15.

Figure 13:
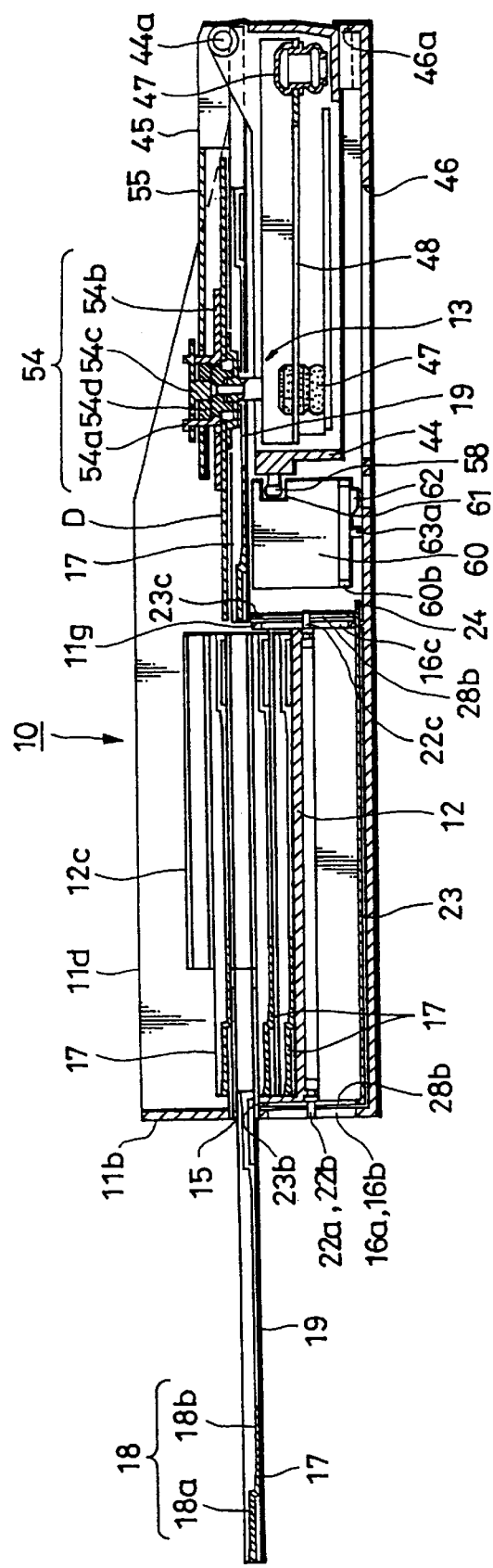
FIG. 13 is a cross-sectional view corresponding to FIG. 12 and showing the eject state of the disc player apparatus shown in FIG. 2.

In this state, as described above, if the tray insert and eject mechanism 34 is operated to project the disc tray 17 of the third stage from the tray entrance 15, then even when other optical disc D is being reproduced, a desired disc tray 17 can be projected, i.e. ejected from the disc reproducing apparatus 10 so that the optical disc D can be exchanged and that a new optical disc can be loaded. FIG. 13 shows the eject state of the disc tray 17 presented during the optical disc D is being reproduced.

Thereafter, by pressing the projected disc tray 17 or by operating the corresponding tray operation switch, not shown, to operate the tray insert and eject mechanism 34, this disc tray 17 is housed in the tray holder 12. Thus, the tray holder 12 becomes able to elevate. For example, when the tray holder 12 is further elevated to eject the disc tray of the second stage or the first stage housed in the tray holder 12 and a new optical disc D can be held on or loaded onto this disc tray or the optical disc D can be exchanged. When the tray holder 12 is lowered, the disc tray 17 on which there was so far held the reproduced optical disc D can be returned to the tray housing portion of the fifth stage of the tray holder 12.

Then, after the reproduction operation of musical performance or the like is finished, while the driving of the spindle motor 50 is stopped, the cam drive motor 67 of the cam drive mechanism 64 is driven to rotate the cam member 60 in the counter-clockwise direction in FIG. 17. Thus, the cam pin 58 is released from the upper horizontal portion 61b of the cam groove 61 and moved to the lower horizontal portion 61c through the inclined portion 61a. As a result, the attitude of the swing frame 44 is changed from approximately the horizontal state shown in FIG. 12 to the inclined state shown in FIG. 11.

At that time, when the swing frame 44 is rotated in the lower direction, the turntable 51 is progressively lowered and the turntable 51 is detached from the disc clamper 54 against the adsorbing force of the magnet 54d. As a consequence, the optical disc D is released from being chucked by the turntable 51 or the like, and the optical disc D is left on the disc holding portion 18 of the disc tray 17, whereafter the swing frame 44 is lowered to the position shown in FIG. 11. Thus, the disc tray 17 can be conveyed from the disc loading portion to the tray housing portion of the fifth stage of the tray holder 12. At that time, the turntable 51 and the optical pickup device 14 provided on the swing frame 44 are made distant from the rear surface of the disc tray 17.

Then, when the sun gear 73c is rotated in the broken arrow direction in FIG. 17, i.e. in the counter-clockwise direction in response to the rotation direction of the tray conveying motor 78, the planet gear 73d that is meshed with the sun gear 73c is similarly rotated around the outer periphery of the sun gear 73c in the counter-clockwise direction as shown by a solid line in FIG. 17. Thus, the translating gear 82 supported to the translating link 81 similarly to the planet gear 73d is moved straight along the rectangular hole 83a which guides the translating shaft 81a supporting the translating gear 82 in the backward direction. The rotation force of the large-diameter gear portion 82b of the translating gear 82 is transmitted to the rack 21.

At that time, since the translating gear 82 is rotated in the counter-clockwise direction, by the rotation force transmitted from the large-diameter gear portion 82b to the rack 21, the disc tray 17 is moved in the forward direction, i.e. in the direction to the tray holder 12. When the disc tray 17 is conveyed in the forward direction by a predetermined distance and conveyed to the tray housing portion of the tray holder 12, the driving of the tray conveying motor 78 is stopped. Thus, this disc reproducing apparatus 10 is returned to the initial tray housing state shown in FIG. 4. If it is detected whether or not the detection switch, for example, is operated by the disc tray 17, then it becomes possible to detect whether or not the disc tray 17 is moved from the position at which the optical disc D can be held on the turntable 51 to the position at which the disc tray 17 is housed in the tray holder 12.

The present invention has been described so far. The present invention is not limited to the above-mentioned embodiment. While the present invention is applied to the disc reproducing apparatus capable of only reproducing the optical disc as the disc-like recording medium as described above, for example, the present invention is not limited thereto and may be applied to a disc recording and reproducing apparatus which is able to not only reproduce but also record a magnetooptical disc as a disc-like recording medium. Further, while the five disc trays are disposed in the stacked state in five layers as described above, the number of the disc trays may be less than four and also may be greater than six.

While the swing frame is rotated about the rotary shaft portion to change its attitude and the disc-like recording medium is chucked onto the turntable as described above, the present invention is not limited thereto, and the swing frame may be moved in parallel to the disc tray to change the attitude of the swing frame so that the disc-like recording medium can be chucked onto the turntable. As set forth above, the present invention can be variously modified without departing from the gist of the present invention.

What is claimed is:

1. A recording medium recording and/or reproducing apparatus comprising:
   a plurality of holding members on which recording media can be held;
   recording and/or reproducing means for recording or reproducing the recording media on said holding members;
   housing means for housing said plurality of holding members in such a manner that said holding members are stacked;
   elevating means for elevating said housing means in the direction approximately parallel to the direction in which said plurality of holding members are stacked;
   translating means for translating said holding members between, and stopping said holding members at, a first position at which said holding members hold the recording media, a second position at which said holding members are housed in said housing means and a third position at which the recording medium on said holding member is recorded or reproduced by said recording and/or reproducing means; and
   a single motor for supplying a driving force to said elevating means and said translating means.

2. A recording medium recording and/or reproducing apparatus as claimed in claim 1, wherein said apparatus further includes driving means for selectively supplying the driving force from said motor to said elevating means and said translating means.

3. A recording medium recording and/or reproducing apparatus as claimed in claim 2, wherein said translating means includes a first translating operation portion for translating said holding members between said first and second positions and a second translating operation portion for translating said holding members between said second and third positions.

4. A recording medium recording and/or reproducing apparatus as claimed in claim 3, wherein said driving means selectively supplies the driving force from said motor to said second translating operation portion and said elevating means.

5. A recording medium recording and/or reproducing apparatus as claimed in claim 4, wherein said driving means includes a transmission gear which is moved between said second translating operation portion and said elevating means.

6. A recording medium recording and/or reproducing apparatus as claimed in claim 5, wherein said holding member includes a first rack portion, said second translating operation portion includes a first driving gear meshed with said first rack portion to receive a driving force from said transmission gear, said elevating means includes a second rack portion and a second driving gear meshed with said second rack portion to receive the driving force from said transmission gear.

7. A recording medium recording and/or reproducing apparatus as claimed in claim 6, wherein said second translating operation portion includes a change-over mechanism for translating said first driving gear between a position at which said driving gear is meshed with said first rack portion and a position at which said first gear is released from being meshed with said first rack portion.

8. A recording medium recording and/or reproducing apparatus as claimed in claim 5, wherein said driving means includes a selection operation mechanism for translating said transmission gear between a position at which said transmission gear transmits the driving force from said motor to said second translating operation portion and a position at which said transmission gear transmits the driving force from said motor to said elevating means.

9. A recording medium recording and/or reproducing apparatus as claimed in claim 8, wherein said selection operation mechanism includes a cam portion and a selection operation member translated by said cam portion to translate said transmission gear between a position at which said transmission gear transmits the driving force from said motor to said second translating operation portion and a position at which said transmission gear transmits the driving force from said motor to said elevating means.

10. A recording medium recording and/or reproducing apparatus as claimed in claim 9, wherein said apparatus includes operation means for translating said recording and/or reproducing means between a recording and/or reproducing position at which said recording and/or reproducing means reproduces or records the recording medium and a recording medium non-recording or reproducing position.

11. A recording medium recording and/or reproducing apparatus as claimed in claim 10, wherein said operation means includes a rotation member for translating said recording and/or reproducing means between said recording and/or reproducing position and said non-recording or reproducing position and said cam portion is provided on said rotation member.

12. A recording medium recording and/or reproducing apparatus as claimed in claim 6, wherein said first translating operation portion further includes a driving gear translated between a position at which said driving gear is meshed with said first rack portion and a position at which said driving gear is released from being meshed with said first rack portion.

13. A recording medium recording and/or reproducing apparatus comprising:
    a plurality of holding members on which recording media can be held;
    recording and/or reproducing means for recording or reproducing recording media on said holding members;
    housing means for housing said plurality of holding members in such a manner that said holding members are stacked;
    elevating means for elevating said housing means in the direction approximately parallel to the direction in which said plurality of holding members are stacked;
    translating means for translating said holding members between, and stopping said holding members at, a first position at which said holding members hold the recording media, a second position at which said holding members are housed in said housing means and a third position at which the recording medium on said holding member is recorded or reproduced by said recording and/or reproducing means;
    a single motor for supplying a driving force to said elevating means and said translating means; and
    driving means for selectively driving said translating means and said elevating means based on a driving force from said motor,
    wherein while the recording medium is being recorded or reproduced by said recording and/or reproducing means, said driving means operates said elevating means and drives said translating members to translate any one of said plurality of holding means housed in said housing means from said second position to said first position.

14. A recording medium recording and/or reproducing apparatus as claimed in claim 13, wherein said translating means includes a first translating operation portion for translating said holding members between said first and second positions and a second translating operation portion for translating said holding members between said second and third positions.

15. A recording medium recording and/or reproducing apparatus as claimed in claim 14, wherein said driving means selectively supplies the driving force from said motor to said second translating operation portion and said elevating means.

16. A recording medium recording and/or reproducing apparatus as claimed in claim 15, wherein said driving means includes a transmission gear which is moved between said second translating operation portion and said elevating means.

17. A recording medium recording and/or reproducing apparatus as claimed in claim 16, wherein said holding member includes a first rack portion, said second translating operation portion includes a first driving gear meshed with said first rack portion to receive a driving force from said transmission gear, said elevating means includes a second rack portion and a second driving gear meshed with said second rack portion to receive the driving force from said transmission gear.

18. A recording medium recording and/or reproducing apparatus as claimed in claim 17, wherein said second translating operation portion includes a change-over mechanism for translating said first driving gear between a position at which said driving gear is meshed with said first rack portion and a position at which said first gear is released from being meshed with said first rack portion.

19. A recording medium recording and/or reproducing apparatus as claimed in claim 16, wherein said driving means includes a selection operation mechanism for translating said transmission gear between a position at which said transmission gear transmits the driving force from said motor to said second translating operation portion and a position at which said transmission gear transmits the driving force from said motor to said elevating means.

20. A recording medium recording and/or reproducing apparatus as claimed in claim 19, wherein said selection operation mechanism includes a cam portion and a selection operation member translated by said cam portion to translate said transmission gear between a position at which said transmission gear transmits the driving force from said motor to said second translating operation portion and a position at which said transmission gear transmits the driving force from said motor to said elevating means.

21. A recording medium recording and/or reproducing apparatus as claimed in claim 20, wherein said apparatus includes operation means for translating said recording and/or reproducing means between a recording or reproducing position at which said recording and/or reproducing means reproduces or records the recording medium and a recording medium non-recording or reproducing position.

22. A recording medium recording and/or reproducing apparatus as claimed in claim 21, wherein said operation means includes a rotation member for translating said recording and/or reproducing means between said recording or reproducing position and said non-recording or reproducing position and said cam portion is provided on said rotation member.

23. A recording medium recording and/or reproducing apparatus as claimed in claim 17, wherein said first translating operation portion further includes a driving gear translated between a position at which said driving gear is meshed with said first rack portion and a position at which said driving gear is released from being meshed with said first rack portion.

24. A recording medium loading apparatus comprising:
a plurality of holding members on which recording media can be held;
housing means for housing said plurality of holding members in such a manner that said holding members are stacked;
elevating means for elevating said housing means in the direction approximately parallel to the direction in which said plurality of holding members are stacked;
translating means for translating said holding members between, and stopping said holding members at, a first position at which said holding members hold the recording media, a second position at which said holding members are housed in said housing means and a third position located on the same straight line of the first and second positions and opposite to said first position across said housing means; and
a single motor for supplying a driving force to said elevating means and said translating means.

25. A recording medium loading apparatus as claimed in claim 24, wherein said apparatus further includes driving means for selectively supplying the driving force from said motor to said elevating means and said translating means.

26. A recording medium loading apparatus as claimed in claim 25, wherein said translating means includes a first translating operation portion for translating said holding members between said first and second positions and a second translating operation portion for translating said holding members between said second and third positions.

27. A recording medium loading apparatus as claimed in claim 26, wherein said driving means selectively supplies the driving force from said motor to said second translating operation portion and said elevating means.

28. A recording medium loading apparatus as claimed in claim 27, wherein said driving means includes a transmission gear which is moved between said second translating operation portion and said elevating means.

29. A recording medium loading apparatus as claimed in claim 28, wherein said holding member includes a first rack portion, said second translating operation portion includes a first driving gear meshed with said first rack portion to receive a driving force from said transmission gear, said elevating means includes a second rack portion and a second driving gear meshed with said second rack portion to receive the driving force from said transmission gear.

30. A recording medium loading apparatus as claimed in claim 29, wherein said second translating operation portion includes a change-over mechanism for translating said first driving gear between a position at which said driving gear is meshed with said first rack portion and a position at which said first gear is released from being meshed with said first rack portion.

31. A recording medium loading apparatus as claimed in claim 28, wherein said driving means includes a selection operation mechanism for translating said transmission gear between a position at which said transmission gear transmits the driving force from said motor to said second translating operation portion and a position at which said transmission gear transmits the driving force from said motor to said elevating means.

32. A recording medium loading apparatus as claimed in claim 31, wherein said selection operation mechanism includes a cam portion and a selection operation member translated by said cam portion to translate said transmission gear between a position at which said transmission gear transmits the driving force from said motor to said second translating operation portion and a position at which said transmission gear transmits the driving force from said motor to said elevating means.

33. A recording medium loading apparatus as claimed in claim 29, wherein said first translating operation portion further includes a driving gear moved between a position at which said driving gear is meshed with said first rack portion and a position at which said driving gear is released from being meshed with said first rack portion.

34. A recording medium loading apparatus comprising:
a plurality of holding members on which recording media can be held;
housing means for housing said plurality of holding members in such a manner that said holding members are stacked;
elevating means for elevating said housing means in the direction approximately parallel to the direction in which said plurality of holding members are stacked;
translating means for translating said holding members between, and stopping said holding members at, a first position at which said holding members hold the recording media, a second position at which said holding members are housed in said housing means and a third position located on the same straight line of the first and second positions and opposite to said first position across said housing means;
a single motor for supplying a driving force to said elevating means and said translating means; and
driving means for selectively driving said translating means and said elevating means based on a driving force from said motor,
wherein under the condition that one of said plurality of holding members is located at said third position, said driving means drives said elevating means and said translating means to translate any one of said plurality of holding members housed in said housing means from said second position to said first position.

35. A recording medium loading apparatus as claimed in claim 34, wherein said translating means includes a first translating operation portion for translating said holding members between said first and second positions and a second translating operation portion for translating said holding members between said second and third positions.

36. A recording medium loading apparatus as claimed in claim 35, wherein said driving means selectively supplies the driving force from said motor to said second translating operation portion and said elevating means.

37. A recording medium loading apparatus as claimed in claim 36, wherein said driving means includes a transmission gear which is moved between said second translating operation portion and said elevating means.

38. A recording medium loading apparatus as claimed in claim 37, wherein said holding member includes a first rack portion, said second translating operation portion includes a first driving gear meshed with said first rack portion to receive a driving force from said transmission gear, and said elevating means includes a second rack portion and a second driving gear meshed with said second rack portion to receive the driving force from said transmission gear.

39. A recording medium loading apparatus as claimed in claim 38, wherein said second translating operation portion includes a change-over mechanism for translating said first driving gear between a position at which said driving gear is meshed with said first rack portion and a position at which said first gear is released from being meshed with said first rack portion.

40. A recording medium loading apparatus as claimed in claim 37, wherein said driving means includes a selection operation mechanism for translating said transmission gear between a position at which said transmission gear transmits the driving force from said motor to said second translating operation portion and a position at which said transmission gear transmits the driving force from said motor to said elevating means.

41. A recording medium loading apparatus as claimed in claim 40, wherein said selection operation mechanism includes a cam portion and a selection operation member translated by said cam portion to translate said transmission gear between a position at which said transmission gear transmits the driving force from said motor to said second translating operation portion and a position at which said transmission gear transmits the driving force from said motor to said elevating means.

42. A recording medium loading apparatus as claimed in claim 41, wherein said apparatus includes operation means for translating said recording and/or reproducing means between a recording or reproducing position at which said recording and/or reproducing means reproduces or records the recording medium and a recording medium non-recording or reproducing position.

43. A recording medium loading apparatus as claimed in claim 42, wherein said operation means includes a rotation member for translating said recording and/or reproducing means between said recording or reproducing position and said non-recording or reproducing position and said cam portion is provided on said rotation member.

44. A recording medium loading apparatus as claimed in claim 38, wherein said first translating operation portion further includes a driving gear translated between a position at which said driving gear is meshed with said first rack portion and a position at which said driving gear is released from being meshed with said first rack portion.

* * * * *